US008219848B2

(12) United States Patent
Branson et al.

(10) Patent No.: US 8,219,848 B2
(45) Date of Patent: Jul. 10, 2012

(54) MECHANISM FOR RECOVERY FROM SITE FAILURE IN A STREAM PROCESSING SYSTEM

(75) Inventors: Michael John Branson, Rochester, MN (US); Frederick Douglis, Basking Ridge, NJ (US); Bradley William Fawcett, Byron, MN (US); Zhen Liu, Tarrytown, NY (US); Bin Rong, Melbourne (AU); Fan Ye, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 11/733,724

(22) Filed: Apr. 10, 2007

(65) Prior Publication Data

US 2008/0256384 A1    Oct. 16, 2008

(51) Int. Cl.
*G06F 11/00* (2006.01)

(52) U.S. Cl. .................... 714/3; 714/2; 714/4.1; 714/25

(58) Field of Classification Search ............... 714/1–57; 711/100, 106; 702/2, 186; 370/389–401; 717/106
See application file for complete search history.

(56) References Cited

U.S. PATENT DOCUMENTS

| 6,587,970 | B1 * | 7/2003 | Wang et al. | 714/47 |
| 6,973,473 | B1 * | 12/2005 | Novaes et al. | 709/201 |
| 2002/0112196 | A1 * | 8/2002 | Datta et al. | 714/4 |
| 2002/0188426 | A1 * | 12/2002 | Datta et al. | 702/186 |
| 2005/0076173 | A1 * | 4/2005 | Merril et al. | 711/100 |

OTHER PUBLICATIONS

Daniel J. Abadi, etc, The Design of the Borealis Stream Processing Engine. CIDR 2005 Second Biennial Conference on Innovative Data Systems Research, 2005.
Daniel J. Abadi, etc, The Design of the Borealis Stream Processing Engine, Second Biennial Conference on Innovative Data Systems Research (CIDR 2005), Asilomar, CA, Jan. 2005.
Lisa Amini, Nevendu Jain, Anshul Sehgal, Jeremy Silber, Oliver Verscheure, Adaptive Control of Extreme-Scale Stream Processing Systems, Proceedings of ICDCS 2006, 2005.
Alain Andreux, Karl Czajkowski, Asit Dan, Kate Keahey, Heiko Ludwig, Toshiyuki Nakata, Jim Pruyne, John Rofrano, Steve Tliecke, Ming Xu. Web Services Agreement Specification, Jul. 2006.

(Continued)

*Primary Examiner* — Scott Baderman
*Assistant Examiner* — Sarai Butler
(74) *Attorney, Agent, or Firm* — August Law, LLC; George Willinghan

(57) ABSTRACT

A failure recovery framework to be used in cooperative data stream processing is provided that can be used in a large-scale stream data analysis environment. Failure recovery supports a plurality of independent distributed sites, each having its own local administration and goals. The distributed sites cooperate in an inter-site back-up mechanism to provide for system recovery from a variety of failures within the system. Failure recovery is both automatic and timely through cooperation among sites. Back-up sites associated with a given primary site are identified. These sites are used to identify failures within the primary site including failures of applications running on the nodes of the primary site. The failed applications are reinstated on one or more nodes within the back-up sites using job management instances local to the back-up sites in combination with previously stored state information and data values for the failed applications. In additions to inter-site mechanisms, each one of the plurality of sites employs an intra-site back-up mechanism to handle failure recoveries within the site.

20 Claims, 10 Drawing Sheets

OTHER PUBLICATIONS

Magdalena Balazinska, Harfu Balakrishnan, Samuel Madden, Mike Stonebaaker. Fault-Tolerance in the Borealis Distributed Stream Processing System. ACM SIGMOD Conf. , Balto, MD Jun. 2005.

M. Balazinska, H. Balakrishnan, M. Stonebraker. Contract-Based Loas Management in Federated Distributed Systems. Symposium on Network System Design & Implementation. Mar. 2004.

D. Beckett.Rdf/xml syntax specification. http://www.w3.org/TR/rdf-syntax-grammar.

Ranjita Bhagwan, Fred Douglis, Kirsten Hildrum, Jeff Kephart, William Walsh. Time-varying Management of Data Storage. First Workshop on Hot Topics in System Dependability, Jun. 2005.

S. Chandrasekaran, O. Cooper, A. Deshpande, M. Franklin, etc TeregraphCQ:Continous Dataflow Processing for an Uncertain World. Conf. on Innovative Data Systems Research, 2003.

F. Douglis, J. Palmer, E. Richards, D. Tao, Etc. Position:Short Object Lifetimes Require a Delete-Optimized Storage System. Proceedings 11th ACM SIGOPS European Workshop 2004.

Ian Foster, Carl Kesselman, Steven Tueke. The Anatomy of the Grid: Enabling Scalable Virtual Organizations. Lecture Notes in Computer Science, 2150, 2001.

Ian Foster, Carl Kesselman. Scaling System-Level Science: Scientific Exploration and IT Implications. IEEE Computer, 39(11):31-39,2006.

Deepak Ganesan, B. Greensten, D. Perelyubskiy, D. Estrin, J. Heidmann. Multi-Resolution Storage and Search in Sensor Networks. ACN Transactions on Storage, Aug. 2005.

Jim Gray, Andreas Reuter. Transaction Processing: Concepts and Techniques. Morgan Kaufmann, 1992.

Theo Haerder, Andreas Reuter. Principles of Transaction-oriented Database Recovery. Readings in Database Systems(2nd ed.)pp. 227-242. Morgan Kaufmann Pub., San Francsico, CA, 1994.

Jeong Hwang, M. Balazinska, A. Rasin, etc. High Availablity Algoritms for Distributed Stream Processing. 21st International Conf. on Data Engineering, ICDE 2005. Japan, Apr. 2005.

IBM.Security in Sytem S. http://domino.research.ibm.com/comm/research_projects.nsf/pages/system_s_security.index,html, 2006.

Navendu Jain, L. Amini, etc. Design, Implementation, and Evaluatiuon of the Linear Road Benchmark on the Dtream Processing Core. 25th ACM SIGMOD Intl. Conf. Management of Data, Jun. 2006.

Chuanfg Liu, Lyang, I. Foster, etc. Design and Evaluation of a Resource Selection Framework for Grid Applications. 11th IEEE Sym. on High Pert. Distributed Computing, Jul. 2006.

H. Ludwig, A. Dan, B.Kearney. Cremona: An Architecture and Library for Creation and Monitoring of WS-Agreements. ACM International Conf. on Service Oriented Computing (ICSOC'04), 2004.

WC3 Recommendation. Web Ontology Language (owl), Feb. 2004.

Anton Riabov, Zhen Liu. Planning for Stream Processing Systems. Proceedings of AAAI-2005, Jul. 2005.

Anton Riabov, Zhen Liu. Scalable Planning for Distributed Stream Processing Systems. Proceedings od ICAPS 2006, Jun. 2006.

T. Risch, M. Koparanova, B. Thide. High-Performance Grid Database Manager for Scientific Data. Proceedings 4th Workshop Distributed Data & Structures, Carleton Scientific Pub., 2002.

Ravi Sandhu. Lattice-Based Access Control Models. IEEE Computer, Nov. 1993.

Michael Stonebraker, U. Cetintemel, S. Zdonik. The 8 Requirements of Real-Time Sream Processing. SIGMOD Record, 34 (4):42-47, 2005.

The Stream Group. DTREAM: The Stanford Stream data Manager. IEEE Data Engineering Bulletin, 26(1), 2003.

G. Werner-Allen, K. Lorincz, M. Welsh, O. Marcillo, etc. Deploying a Wireless Sensor Network on an Active Volcano. IEEE Internet Computing, 10(2):18-25, 2006.

U.S. Appl. No. 11/852,389, filed Oct. 10, 2007, Zachary Adam Garbow, et al.

J. Zhou, L. Ma, O. Liu, Zhang, Y. Yu. Minerva: A Scalable Owl Ontology Storage and Inference System. The First Asian Semantic Web Symposium, 2004.

A.Andrieux, K.Czajkowski, A.Dan, K.Keahey, H. Ludwig, T.Nakata, J.Pruyne, J.Rofrano, S. Tuecke, M.Xu.Ws-Agreement, Version 2006107.GWD-R WGGRAAP-WG, Jul. 2006.

W. Cirne, F. Brasileiro, J. Sauve, N. Andrade, D.Paranhos, E. Santos-Neto, R. Mcdeiros, F. Silva. Grid computing for Bag-of-Tasks applications. Proceedings of the IFIP 13E2003, 2003.

F. Douglis, M. Branson, K. Hildrum, B. Rong, F. Ye. Multi-site cooperative data stream analysis. Operating System Review, 40(3):31-37. 2006.

C.L.Dumitrescu, I. Foster. GRUBER: A Grid Resource Usage SLA BrokER. Lecture Notes in Computer Science, 3648:465-74, 2005.

E. Elmroth and P.Gardfjall. Design and Evaluation of a Decentralized System for Grid-wide Fairshare Scheduling. 1st Int'l Conf. on e-Science and Grid Computing, pp. 221-229, 2005.

K.H.Kim, R.Buyya. Policy based Resource Allocation in Heirarchical Virtual Org. for Global Grids. Proceedings 18th Int'l SBAC-PAD'06-vol. 00, pp. 36-46, 2006.

N. H. Vaidya, Impact of Checkpoint Latency on Overhead Ratio of a Checkpointing Scheme, IEEE Trans. Comput., 46(8):942-947, 1997, ISSN 0018-9340.

Steve Lohr. Unused PC power to run grid for unraveling disease. The New York Times, Nov. 2004.

R. Zheng and H. Jin. An Integrated Management and Scheduling Scheme for Computational Grid. In the 2nd Int'l workshop on grid and cooperative computing. Springer, Dec. 2003.

J.U. In, P.Avery, R.Cavanaugh. Policy based scheduling for simple quality of service in grid computing. Parallel & Distributed Processing Symposium, 2004. Proceedings. 18th Int'l,04.

A.Borg, J.Baumbach, S.Glazer, A Message Ssytem Supporting Fault Tolerance, SOSP '83, Proc. 9th ACM Symps. Operating Systems Principles, pp. 90-99. ACM Press, NY, NY, USA19133, ISBN89791-115.

F.Gelenbe, On the Optimum Checkpoint Interval., J. ACM, 26(2):259-270, 1979, ISSN 0004-5411.

J Hwang, Y. Xing, U. Cetintemel, S.Zdonik, A Cooperative, Self-Configuring High-Availability Solution for Stream Processing, Dept. of Computer Science, Brown University.

GLPK online resource, http://www.gnu.org/software/glpk/, Nov. 23, 2006.

J.Blythe, E.Deelman, Y.Gil, K.Kesselman, A.Agarwal, G.Mehta, K.Vahi, The Role of Planning in Grid Computing, Proc. of ICAPS-03, 2003.

J. Blythe, E. Deelman, Y.Gil, C. Kesselman, H.Tangmurarunkit, Artificial Intelligence and Grids: Workflow Planning and Beyond, IEEE Intelligents Systems, 2004.

A. Brown, A. Keller, J.Hellerstein, A Model of Configuration Complexity and its Application to a Change Management System, Proc. of IM-05,2005.

E. Sirin, B. Parsia, Planning for Semantic Web Services, Semantic Web Services Workshop at 3rd ISWC, May 2004.

J.Heflin, H. Munoz-Avila, LCW Based Agent Planning for the Semantic Web, Ontologies and The Semantic Web, AAAi Workshop, 2002.

F.L'ecu'e, A. L'eger, A Formal Model for Semantic Web Service Composition, ISWC, 2006.

S. Narayanan, S.McIlraith, Simulation, Verification and Automated Composition of Web Services, WWW,2002.

M. Sheshagiri, M DesJardin, T. Finin, A Planner for Composing Services Described in DAML-S in Web Services and Agent Based Engineering-AAMAS, 2003.

P. Traverso, M. Pistore, Automated Composition of Semantic Web Services into Executable Processes, ISWC, 2004.

U.S. Appl. No. 11/733,732, filed Apr. 10, 2007, Frederick Dauglis, et al.

U.S. Appl. No. 11/747,826, filed May 11, 2007, Zhen Liu, et al.

U.S. Appl. No. 11/747,820, filed May 11, 2007, Michael J. Branson, et al.

U.S. Appl. No. 11/747,813, filed May 11, 2007, Michael J. Branson, et al.

U.S. Appl. No. 11/733,684, filed Apr. 10, 2007, Michael J. Branson, et al.

U.S. Appl. No. 11/747,694, filed May 11, 2007, Michael J. Branson, et al.

Oscar H. Ibarra, Chul E. Kim, Fast Approximation Algoritms for the Knapsack and Sum of Subset Problems, University of Minnesota, Minneapolis, Minnesota, Jun. 1974.

Ivan D. Baev, Rajmohan Rajaraman, Approximation Alogorithms for Data Placement in Arbitrary Networks, Northereastern University, Boston, MA.

M.R. Garey, D.S. Johnson, Computers and Intractability: A Guide to the Theory of NP-Completeness, W.H.Freeman & Co., NY, NY, USA, 1990, ISBN 0716710455.

L.Fleischer, M.X.Goemans, etc., Tight Approximation Algoritms for Maximum General Assignment Problems, SODA17thACM-SIAM Symposiumon Discrete Algorithmsp611-620, Miami, FL, 2006.

R.D. Schlichting, F.B. Schneider, Fail Stop Processors: An Approach to Designing Fault Tolerant Computing Systems, ACM Trans Comput. Sys.1(3):222-238, 1983, ISSN0734-2071.

C.Swarny, Algorithms for the Data Placement Problem, Unpublished, 2004.

N. H.Vaidya, Impact of Checkpoint Latency on Overhead Ratio of a Checkpointing Scheme, IEEE Trans. Comput., 46(8):942-947, 1997. ISSN 0018-9340.

* cited by examiner (a) Before failure (b) Upon failure

MECHANISM FOR RECOVERY FROM SITE FAILURE IN A STREAM PROCESSING SYSTEM

STATEMENT REGARDING FEDERALLY SPONSORED RESEARCH

The invention disclosed herein was made with U.S. Government support under Contract No. H98230-05-3-0001 awarded by the U.S. Department of Defense. The Government has certain rights in this invention.

FIELD OF THE INVENTION

The present invention relates to data analysis in continuous data streams.

BACKGROUND OF THE INVENTION

Data-driven stream processing has a wide range of applications in many fields, including stock market prediction, intrusion detection, and disaster recovery. It is data-driven in the sense that the analysis system continuously reacts to the streaming data. It is different from traditional database-oriented systems, which operate on static stored data.

Systems for processing streams of data utilize continuous streams of data as inputs, process these data in accordance with prescribed processes and produce ongoing results. Commonly used data processing stream structures perform traditional database operations on the input streams. Examples of these commonly used applications are described in Daniel J. Abadi et al., *The Design of the Borealis Stream Processing Engine*, CIDR 2005—Second Biennial Conference on Innovative Data Systems Research (2005), Sirish Chandrasekaran et al., *Continuous Dataflow Processing for an Uncertain World*, Conference on Innovative Data Systems Research (2003) and The STREAM Group, *STREAM: The Stanford Stream Data Manager*, IEEE Data Engineering Bulletin, 26(1), (2003). In general, systems utilize traditional database structures and operations, because structures and operations for customized application are substantially more complicated than the database paradigm. The reasons for this comparison are illustrated, for example, in Michael Stonebraker, Ugur çetintemel, and Stanley B. Zdonik, *The 8 Requirements of Real-Time Stream Processing*, SIGMOD Record, 34(4): 42-47, (2005).

These systems typically operate independently and work only with the processing resources contained within a single system to analyze streams of data that are either produced by or directly accessible by the single site. Although multiple sites can be used, these sites operate independently and do not share resources or data.

One area of concern in the use of system to process data streams is recovery from failures in software, hardware and applications within the system. Previous work on failure recovery and high availability includes M. Balazinska, H. Balakrishnan, S. Madden, and M. Stonebraker, *Fault-Tolerance in the Borealis Distributed Stream Processing System*, SIGMOD '05: Proceedings of the 2005 ACM SIGMOD international conference on Management of data, pages 13-24. ACM Press, New York, N.Y., USA, 2005. ISBN 1-59593-060, in which fault tolerance was achieved by employing "process-pairs," thus incurring a high overhead that was acceptable in their under-utilized system but is not consistent with the design philosophy of some large scale distributed systems. Other approaches are described in J. Hwang, Y. Xing, U. Cetintemel, and S. Zdonik, A Cooperative, Self-Configuring High-Availability Solution for Stream Processing. In ICDE'07 and J.-H. Hwang, M. Balazinska, A. Rasin, U. Cetintemel, M. Stonebraker, and S. Zdonik, High-Availability Algorithms for Distributed Stream Processing, ICDE '05: Proceedings of the 21st International Conference on Data Engineering (ICDE '05), pages 779-790. IEEE Computer Society, Washington, D.C., USA, (2005) ISBN 0-7695-2285-8, however these approaches have several shortcomings including an inability to work with heterogeneous systems or to support multiple independent failures. In general, previous work either only focused on offering high availability or was only applicable to a relatively homogeneous environment.

SUMMARY OF THE INVENTION

Systems and methods in accordance with the present invention provide for negotiated cooperation among a plurality of independent sites to share data and processing resources in order to process user-defined inquiries, i.e., formal specifications of desired end results of the user, over continuous dynamic streams of data and also to provide for failure recovery within the system. Cooperative data stream processing systems in accordance with the present invention provide for large-scale stream data processing among cooperating independent organizations. Each one of the plurality of independent distributed sites within the cooperative data stream processing system is a local administrative domain and runs an instance of the key cooperative data stream processing system components, such as Inquiry Services (INQ), Data Source Manager (DSM) and Job Manager (JMN). The cooperative data stream processing system users initiate stream processing by submitting an inquiry to the INQ component, through the interaction with a graphical user interface (GUI) user environment. The inquiry is transformed into a set of jobs by the planner within INQ, taking into account many other factors, such as data source requirements, resource availability, and privacy and security considerations. The features of the jobs are expressed using a prescribed high level language such as Job Description Language (JDL). These jobs are subsequently sent to the JMN component, which deploys the jobs as applications in the form of a set of inter-connected Processing Elements (PEs).

Multiple sites within the cooperative data stream processing system can cooperate with each other. For example, remote data access and remote processing are allowed in the cooperative data stream processing system, i.e., sites share data with other sites and perform processing on behalf of other sites. The interaction between individual sites is governed by Common Interest Policies (CIPs) that shape the cooperation models between sites, by defining which actions are allowed and which are forbidden. The CIPs specify the interoperability between sites. In particular, sites can negotiate with each other and become allies with other sites for failure recovery. An agreement is reached between these allies, specifying what resources they may offer to other sites in case of site failures.

In accordance with one exemplary embodiment, the present invention is directed to a method for providing failure recovery in cooperative data stream processing. A plurality of distributed sites is identified, and each site contains one or more nodes and capable of independently hosting on the nodes applications associated with jobs derived from inquiries to process continuous dynamic streams of data. An inter-site back-up mechanism is used to provide failure recovery for the software, hardware, applications and system components operating on the sites. The inter-site back-up mechanism includes back-up sites selected from the identified plurality of sites. In one embodiment, use of the inter-site back-up mechanism further includes identifying a primary site from the plurality of distributed sites and selecting a plurality of back-up sites from the plurality of distributed sites to provide failure recovery for the identified primary site.

In one embodiment, use of the inter-site back-up mechanism includes saving current state information and current data values at pre-determined intervals for one or more applications hosted on the nodes. In order to save current state information and data values, high priority applications having associated priority levels above a pre-determined level are identified to have state information and data values saved. In addition, for each identified application the pre-determined interval for saving state information and data values is identified. This pre-determined interval can be determined empirically.

In one embodiment, a monitoring site is identified to monitor for a periodically emitted signal from the identified primary site indicating that the primary site is operating within prescribed parameters. When using this monitoring site, a pre-defined interval for sending the periodically emitted signal from the identified primary site to the identified monitoring site is identified, and an inter-site failure recovery procedure is initiated if the periodically emitted signal is not received at the monitoring site within the pre-defined interval. In addition, a plurality of additional sites can be identified to monitor for the periodically emitted signal, and the status of receipt of the periodically emitted signals at each one of the additional sites is communicated to the monitoring site. The pre-defined interval is identified, and an inter-site failure recovery procedure is initiated if the periodically emitted signal is not received at the monitoring site within the pre-defined interval and the status of receipt at all of the additional monitoring sites is that the periodically signal was not received.

In one embodiment, initiation of the inter-site failure recovery procedure includes using a failover manager in communication with each one of the identified back-up sites to prohibit more than one of the identified back-up sites from initiating the inter-site failure recovery. In one embodiment, one or more critical applications running on the primary site are identified. When a failure condition is identified on the primary site, the identified critical applications are recovered for the failed primary site. In one embodiment, the steps to recover the critical applications include retrieving previously saved state information and data values for the critical applications, using job manager instances on the back-up sites to reinstate the critical applications, reestablishing connections between the critical and appropriate data streams, reestablishing tunneling among sites for inter-site output of data generated by the reinstated applications and combinations thereof. In addition, recovery of the critical applications includes halting existing tunneling with the failed primary site, creating new monitoring agreements to handle the recovered critical applications, reconfiguring tunneling with the recovered critical applications and re-deploying critical applications to back-up sites. In one embodiment, sites cooperating with the failed primary site and affected by the failure of the primary site are notified.

In one embodiment, reinstating the critical applications further includes compensating for differences in execution environments between the primary site and the back-up sites. In addition to using the inter-site back-up mechanism, an intra-site back-up mechanism is used on each one of the plurality of identified sites to provide failure recovery. Use of this intra-site back-up mechanism includes terminating lower priority applications running on nodes within a given site and redistributing higher priority applications among all of the nodes on the given site. In one embodiment, each site includes an inquiry services layer to produce jobs from inquiries in high level languages and to facilitate description of jobs in a desired language, and use of the intra-site back-up mechanism includes using the inquiry services layer to replan, reproduce and the execute at least a portion of the jobs executing on a given site based upon resource availability on different recovery site following a failure of a given site. In one embodiment, each site includes components capable of independently processing continuous dynamic streams of data, and the use of the inter-site back-up mechanism includes using the inter-site back-up mechanism to recover the components running on each site.

DETAILED DESCRIPTION

Figure 1:
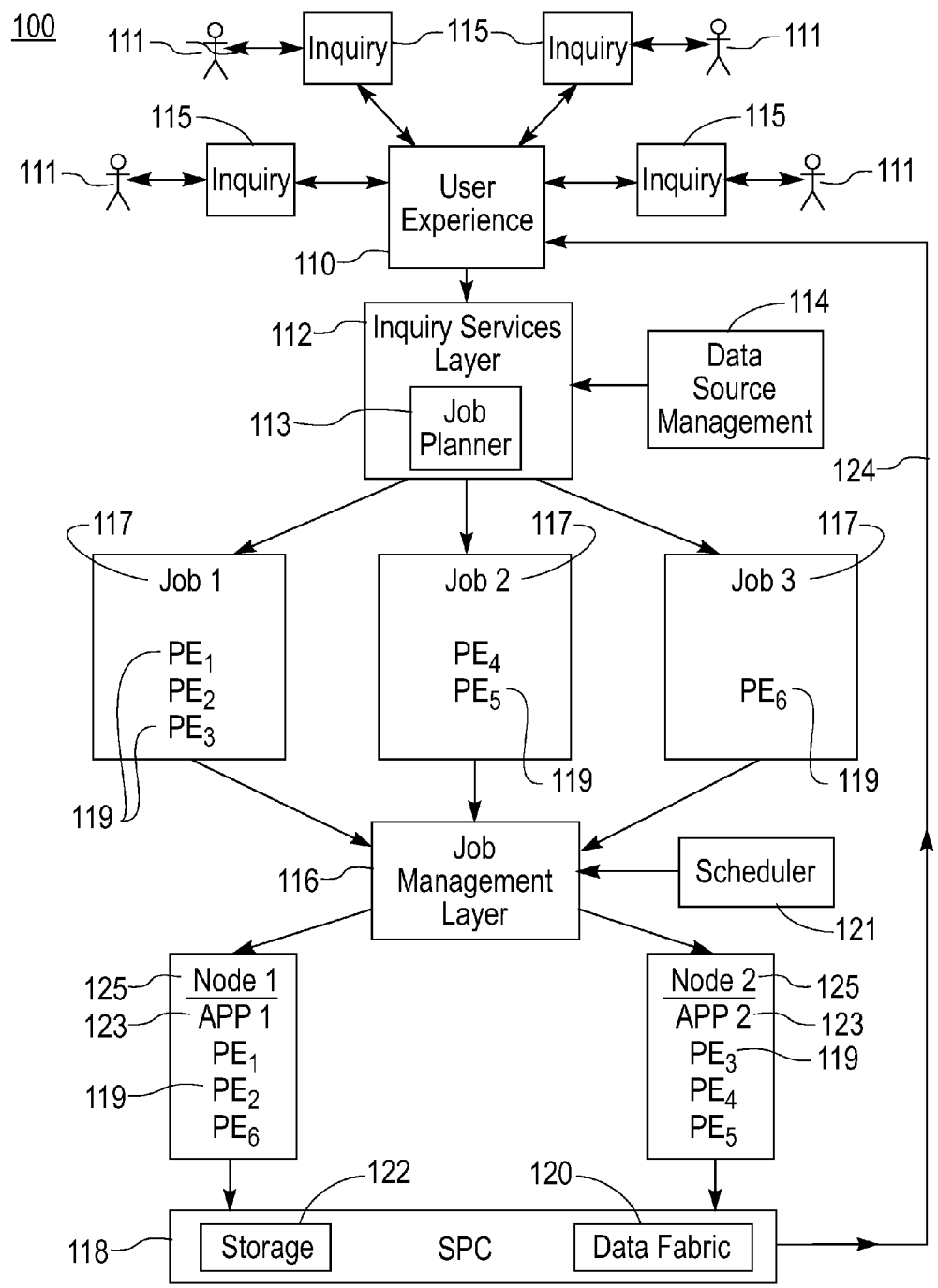
FIG. 1 is a schematic representation of an embodiment of a system architecture for use on all sites within the cooperative data processing system of the present invention.

Systems and methods in accordance with the present invention provide for the inter-cooperation of multiple, autonomous, distributed stream processing sites. Each individual stream processing site is capable of processing a continuous dynamic flow of information that is created internally at that site or that originates from sources external to that site. Important or relevant information is extracted from a continuous stream containing voluminous amounts of unstructured and mostly irrelevant data. Processing of data streams in accordance with the present invention is utilized in analyzing financial markets, for example predicting stock value based on processing streams of real-world events, supporting responses to natural disasters such as hurricanes and earthquakes, for example based on the movement of rescue vehicles, available supplies or recovery operations and in processing sensor data. Examples of sensor data that can be analyzed include data on volcanic activity as described in G. Werner-Allen et al., *Deploying a Wireless Sensor Network on an Active Volcano*, IEEE Internet Computing, 10(2): 18-25 (2006) and telemetry from radio telescopes as described in T. Risch, M. Koparanova and B. Thide, *High-performance*

GRID Database Manager for Scientific Data, Proceedings of 4th Workshop on Distributed Data & Structures (WDAS-2002), Carleton Scientific (Publ), 2002.

Exemplary embodiments of cooperative data processing systems in accordance with the present invention provide for rapid system reconfiguration. The system adjusts quickly to the changing requirements and priorities of users and administrators. As the system adjusts, it simultaneously identifies and incorporates new input streams into its processing and manages the loss of existing data sources or processing capacity.

Cooperative data stream processing systems in accordance with the present invention function well under high load. In one embodiment, the system is assumed to be in a constant state of overload and must continually adjust its resource allocations to support the highest priority activities. Applications utilizing exemplary embodiments of the system for cooperative data stream processing in accordance with the present invention contain significant resilience to variations in processing resources, missing data, available input streams and site failures among others. The missing data include data that is replaced by more important data as described in Fred Douglis et al., *Short Object Lifetimes Require a Delete-Optimized Storage System*, Proceedings of 11th ACM SIGOPS European Workshop (2004).

Exemplary systems for cooperative data stream processing in accordance with the present invention are typically heterogeneous. A given system for cooperative data stream processing contains a plurality of distributed sites. In one embodiment, each site is autonomous. Certain sites include substantial processing capacity, for example, thousands of processing nodes and terabytes to petabytes of storage. Other sites within the system have limited resources. Sites with limited resources may provide specialized or specific tasks such as data acquisition. Although two or more sites can be operated by a single domain or organization, each one of the plurality of sites is preferably completely autonomous and can vary significantly in execution environment, policies and goals. The extent and type of cooperation provided by each autonomous site varies based on the structure and compatibility of any given set of sites.

Cooperative data stream processing systems in accordance with the present invention include a stream processing core to manage the distributed execution of software components of applications, a nano-scheduler to control the traffic flow between processing elements, a storage management system to control the data to be persisted in the storage system based on retention values, a planner to assemble applications or jobs based on user requests and available software components and a security enforcement architecture. In general, the plurality of sites that are contained with the cooperative data stream processing systems cooperate. The resultant interactions are supported and balanced against other requirements and challenges including autonomy, privacy and security constraints and differences in execution environments among the various sites.

Exemplary systems in accordance with the present invention utilize cooperation among the various sites. This cooperation takes several forms. Sites cooperate by exchanging data. Each site can pass primal data streams on to other sites that need to analyze the same input data. Primal data streams are data streams that are brought into one site from outside the system. In addition, each site can pass derived data streams on to other sites. Derived data streams are data streams that are created within a site using analysis of other streams, for example primal data streams. Sites also cooperate by sharing resources such as execution resources, software resources and hardware resource, among others, in order to handle processing overloads. Overloads result from sudden increases in the system workload or sudden decreases in available resources, for example due to partial failure of a given site. In the case of a complete failure of a given site, cooperation provides for the shifting of important processing to another site. Cooperation also provides for access to specialized resources, for example devices and services that are unique to certain sites.

Referring initially to FIG. 1, an exemplary embodiment of an architecture 100 for the cooperative data stream processing systems of the present invention is illustrated. The architecture includes a plurality of layers. This first or highest layer is the user experience (UE) layer 110. The UE layer provides the interface between the cooperative data stream processing system and users 111 of the system. Each user interacts with the system through an interface such as a graphical user interface (GUI) on a computing system in communication with one or more of the plurality of sites within the system. Through this interface, each user presents inquiries 115 to the system that the system processes through one or more primal or derived data streams using the cooperating sites within the system. In one embodiment, these inquiries are converted to high-level queries. An example of a high-level query is to provide a listing containing the locations of all bottled water reserves within a hurricane relief area. The UE layer 110 is also used by the cooperative data stream processing system to deliver the query results through the UE to the requesting user.

In communication with the UE layer is the inquiry services (INQ) layer 112. The INQ layer facilitates the description of a user's job request and the desired final results in a pre-determined high level language. These high level languages are used to depict the semantic meaning of the final results and to specify user preferences such as which data sources to include in or to exclude from the plan. The INQ layer includes a job planner 113 subcomponent that determines or identifies, based on the user-defined inquiries as expressed in the appropriate high level language, appropriate primal or derived data sources and processing elements (PEs) that can achieve the desired goals of the inquiry. A job contains a composition of data sources and processing elements interconnected in a flow graph. The job planner subcomponent submits the produced jobs to the job management component 116 for execution. The job planner subcomponent, in defining the jobs, takes into account various constraints, for example, available input data sources, the priority of the user-defined inquiry, processing available to this inquiry relative to everything else being produced by the system and privacy and security constraints, among other factors. Examples of suitable planner components are described in Anton Riabov and Zhen Liu, *Planning for Stream Processing Systems*, Proceedings of AAAI-2005, July 2005 and Anton Riabov and Zhen Liu, *Scalable Planning for Distributed Stream Processing Systems*, Proceedings of ICAPS 2006, June 2006.

In one embodiment, the cooperative data stream processing system includes a data source management (DSM) component 114 in communication with the INQ layer and the job planner. Since there are many possible data streams that a job can process, including both primal streams from outside the system and derived streams created by sites within the system, the DSM component matches jobs, i.e. from user-defined inquiries, with appropriate data streams. In order to match jobs with data streams, the DSM component utilizes constraints specified in the user-defined inquiries. These constraints include, but are not limited to, data type constraints and source quality constraints. The DSM component returns data source records that provide information to access these data sources. In one embodiment, the INQ layer and job planner use the DSM component to formulate job execution plans, which are then submitted to lower levels of the system.

In response to user-defined inquiries and in combination with the data source records provided from the DSM component, the job planner formulates one or more jobs 117 to be executed within the system and delivers these jobs to the job management layer 116 of the system. Each job identified by the job planner subcomponent contains a plurality of interconnected PEs 119. In one embodiment, incoming data stream objects are processed by the system to produce outgoing data stream objects that are routed to the appropriate PE or to storage. The PEs can be either stateless transformers or much more complicated stateful applications. The cooperative data stream processing system through the job management layer identifies the PEs in the submitted jobs and builds one or more applications 123 from the PEs of different jobs by linking these PEs, possibly reusing them among different applications, to enable sophisticated data stream mining. Therefore, even though the PEs are initially associated with a given job, the PEs are re-associated into one or more applications in order to facilitate the desired data stream mining. Thus, the PEs of a given job can be associated with the same application or with different applications and can run on either the same or different processing nodes 125 within the system. In one embodiment, the job management layer 118 within each site is responsible for initiating and terminating jobs through the creation and initiation of the applications containing the PEs of the jobs. In one embodiment, each job management layer is in communication with an optimizing scheduler 121 that allocates nodes to PEs based on criteria including priority, inter-node connectivity and bandwidth requirements. As illustrated, the job management layer is responsible for the creation and initiation of applications on the various nodes. Alternatively, the job planner in the INQ layer includes the functionality to define applications and associate these applications with the appropriate nodes.

The system also includes a stream processing core (SPC) 118 that manages the distributed execution of the PEs contained within the applications. The SPC includes a data fabric 120 component and a storage 122 component. The data fabric component facilitates the transport of data streams between PEs and persistent storage, i.e., storage 122. Therefore, data can optionally be routed to storage as needed. A nano-scheduler provides adaptive connectivity and fine-grained scheduling of communicating applications. In one embodiment, the nano-scheduler is located within the scheduler 121. The scheduler 121 is a three-tier scheduler. The first tier is a macro scheduler running at longer time scales and deciding things such as which jobs to run. The second tier is a micro scheduler running at short time scales and dealing with changes in system state. The third tier is a nano scheduler running at the finest time scale and dealing with flow variations. The storage component uses value-based retention to automatically reclaim storage by deleting the least valuable data at any given time. Results flow back 124 from PEs to the UE layer for delivery to the requesting user.

Each one of the plurality of sites within the cooperative data stream processing system runs an instance of the system architecture illustrated in FIG. 1. Therefore, as used herein, each site is a self-contained, fully functional instance of the cooperative data stream processing system of the present invention. In one embodiment, each site runs an instance of each component of the system architecture as described above in addition to a fault-tolerant service. In one embodiment, each site belongs to a distinct organization and has its own administrative domain, i.e., administrators who manage one site generally exercise no control over the other sites within the system. In this respect, the process of distributing cooperative data stream processing systems of the present invention is similar to Grid Computing. Cooperation among the plurality of sites is achieved by the sites negotiating peering relationships, for example offering resources to each other while retaining a desired level of local autonomy. In one embodiment, two or more sites within the cooperative data stream processing system that want to collaborate for a common goal and benefit negotiate and form one or more virtual organizations (VOs). The sites can be homogeneous, heterogeneous or combinations of heterogeneous or homogeneous sites.

Exemplary embodiments of cooperative data stream processing systems in accordance with the present invention are powerful processing systems capable of solving complex analysis problems. Cooperation among the plurality of distinct, distributed sites enhances the capabilities of the cooperative data stream processing system. With regard to the breadth of analysis provided by the cooperative data stream processing system, a single organization addresses a set of problems that require data analysis by processing only the relevant data that the single organization alone is able to access. However, when two organizations work in conjunction, a larger and more diverse set of data is available for analysis. This increase in the size of available data expands the range of problems that can be analyzed, improves the quality of the resulting output of the analysis and facilitates the addition of analysis types not available in a single organization. For example, a multinational financial services company might perform detailed acquisition and analysis of companies, economies and political situations within the local geographic region of each of its analysis sites. These various sites could interoperate minimally by default, but cooperate closely upon a significant event or when analysis of multinational organizations is required.

Cooperation enhances both reliability and scalability within the system. With regard to reliability, the reliability of one site is significantly improved through the use of agreements with other sites to take over key tasks, by offering processing and storage resources when failures occur. With regard to scalability, cooperation among sites provides increased scalability as extreme scalability cannot be achieved through unbounded growth of an individual site. The cooperation of multiple autonomous sites achieves much higher levels of scalability. In addition, cooperation across sites allows offloading of processing demands to other sites when one site experiences a workload surge.

Cooperative data stream processing systems in accordance with the present invention support a range of distribution or peering models, ranging from basic models to sophisticated models. In one embodiment, the system is arranged to support a range of different peering models between sites. Negotiated common interest policies (CIPs) define the relationships among sites, and thereby the formation of virtual organizations (VOs). Although each VO can be a distinct entity containing an exclusive grouping of sites, different VOs may overlap with one another, i.e., may contain the same sites. Therefore, any one of the plurality of sites can participate in multiple VOs. This structure facilitates basic point-to-point, i.e., site-to-site, peering and peering between entire VOs having sites arranged in hierarchical, centralized or decentralized arrangements. For simplicity, the distribution models discussed below are described in the context of basic point-to-point interaction between sites.

In one embodiment of a basic distribution model, all processing takes place at a home site, i.e., the site performing an inquiry and making use of resources from other sites. Data source sharing is achieved by directly shipping data from remote sites across the network for processing at the home site. Shared data sources include real-time data streams and stored data. Implementing this distribution model creates the necessity for distributed data acquisition capabilities to identify and to access remote data sources and a stream processing engine that can send and receive streams remotely. One advantage of the basic distribution model is simplicity. Data from another site is used with local processing, and the amount of processing and network bandwidth resources consumed are related to the volume of the data streams originating at remote sites. Larger volumes of transferred data, however, consume more resources. Primal streams in particular consume large amounts of resources in this distribution model as these streams undergo little to no processing at the remote site to reduce their size. Derived streams may be at a more manageable data rate, presenting less of an issue, but in some cases even a derived stream is voluminous.

In another embodiment of the distributed processing model, preliminary processing of a data source is conducted at the site from which the data source originates. This arrangement addresses the issue of sending large amounts of data across the network. In addition, duplicate processing is reduced when two or more sites want to access the same data source from a third site and need to perform the same or similar processing. This approach adds complexity, however. If a data source is not already being accessed on the remote site, then processing must be initiated there on behalf of the home site, raising issues of trust between the cooperating sites, as one site is asking the other site to execute potentially arbitrary code on its behalf. The trust issue is addressed using the CIP that exists between the sites. One aspect of a CIP reflects the arrangement each site has negotiated by specifying the data sources each site is willing to share and the types of processing each site is willing to perform on the shared data sources.

Other distribution models achieve more distributed processing. In one embodiment, effective ownership of some resources in the remote site is transferred to the home site. Therefore, the scheduler located at the home site allocates those resources or processing nodes for which ownership has been transferred to the home site. This model is referred to as resource partitioning and requires a relatively high level of cooperation and trust between the remote site and the home site. In another embodiment, processing is scheduled by the remote site and includes commitments regarding the allocated resources. In this embodiment, which is effectively a service-level agreement (SLA) model, a greater degree of site autonomy is maintained. In addition, this model facilitates sharing when multiple sites want to access the same data stream.

In another embodiment of the distributed planning model the availability of both data sources and processing resources at multiple sites are considered as part of the planning process. For example, if the home site requires several data sources from a remote site, the most logical solution may be to send an entire job or application over to that remote site as opposed to communicating the data sources from the remote site to the home site. Similarly, a given set of PEs may be broken down and distributed among a plurality of sites according to the availability of data sources and the processing capability at each site. In order to partition a processing graph intelligently, the availability of data sources, PEs and processing resources at each site must be known. Therefore, the identification of other job components running at a specific site and how important these jobs are in comparison to the one being planned are taken into consideration. In addition, the execution of the distributed plan is monitored closely to ensure that each site involved is operating effectively and that the overall plan is executing as efficiently as possible across the sites. Execution issues discovered via monitoring feedback can trigger re-planning of the entire job or a portion of the job.

Preferably, a combined model approach to distributed planning is used. This combined model approach is more complex than the models described above; however, the combined model is the most powerful model. The combined model approach receives support from several components in the cooperative data stream processing system architecture including the INQ layer and the scheduler. A higher degree of interoperability and trust between sites is utilized by the combined model approach. This higher degree of trust can be based, for example, on the CIPs for the plurality of sites within the cooperative data stream processing system. In general, however, distributed planning is a central feature to system-wide or region-wide effectiveness and efficiency. Multiple sites that cooperate for the good of the entire system as a whole, rather than optimizing independently and in isolation, optimize the use of resources by optimizing the subdivision and placement of jobs according to their inputs, execution patterns and priorities, among other factors.

In one embodiment, an increased level of integration is provided by situating a given instance of the job management layer and scheduler to encompass multiple sites. Therefore, this instance of the job management layer and the scheduler optimize multiple sites concurrently, treating these sites as a whole. This increased level of integration requires the greatest level amount of interoperability and trust between sites. Depending on the degree of integration, sites can be either cooperative, in which the sites work toward certain common goals but retain a significant amount of autonomy, or federated, in which sites subordinate to a single lead site. In one embodiment, the integration arrangement among the sites is expressed in the CIPs.

As was discussed above, when two or more sites located within the cooperative data stream processing system of the present invention agree to interoperate to achieve common or distinct goals that this sites were are unable to achieve in isolation, the sites form a VO. An example of forming VOs is described in Ian Foster, Carl Kesselman and Steven Tuecke, *The Anatomy of the Grid: Enabling Scalable Virtual Organizations*, Lecture Notes in Computer Science, 2150 (2001). In forming a VO, the member sites agree, i.e. negotiate, on inter-operational terms. These negotiated terms are formulated into a CIP for that VO. As member sites of a given VO, each site shares various types of data and processing resources in accordance with the CIP.

In defining the interactions among the member sites, each site agrees to a predetermined style of interoperation for the VO, i.e. cooperative or federated. A federated VO includes an appointed lead site for the VO. The lead site assumes a coordination role and is able to exert a level of control over the other sites. Federated VOs function best when the member sites share a common set of goals. The lead site is able to optimize resource and processing usage to support the common good of the VO or at least the good of the lead site. A cooperative VO lacks a central point of authority. The VO members interact as peers. Each member site is independent of the other sites and may have a separate agenda. However, the member sites recognize that operating in a cooperative manner increases the overall fulfillment in each independent goal.

In general for all VOs, the CIP includes the terms and conditions governing the interoperability among the plurality of member sites of the VO. In one embodiment, the CIP identifies the data streams and locally stored data that are shareable via remote access. This identification includes identifying classes of data streams and other data based on their attributes, since it may not be possible at the time the CIP is created to predict the data streams and other data that will exist in the future. A given CIP references the classes within the terms for that CIP. For example, a given data stream is tagged globally public, locally public or private, and a CIP term is created that grants read accesses for all globally public streams. As another example, a data stream is tagged as coming from a publicly accessible sensor, e.g., a traffic camera, and the CIP contains a term that states that public sensors are freely shared. In one embodiment, a CIP term is general and specifies that any data source located in a particular location, e.g., city, is shared, without such explicit tagging.

The CIP also includes terms to identify processing resources that are sharable. These terms identify member sites that support remote inquiries and, therefore, support the distributed planning interaction model. In addition, these terms identify member sites that only support the distributed processing and distributed data source interaction model. In one embodiment, the CIP terms identify the types of raw processing resources that are available to be shared. Suitable processing resources include, but are not limited to, central processing unit (CPU), memory, storage, software and hardware including special processing hardware. The types of available raw processing resources identify the VO as supporting the resource partitioning model, the SLA-based model or both models. The CIP terms can also identify the member sites that are available to assist in failure recovery processes and the degree of assistance available from each one of these member sites.

The processing resources within the VO can be offered to all member sites of the VO. Alternatively, the processing resources are offered to only a subset of the member sites, as specified in the terms of the CIP. In one embodiment, anything that is not explicitly offered in a CIP is not allowed. By specifying these terms in the CIP, each VO member site is advertising resources that another VO member site may request to use. However, the ability of other member sites to actually use these resources is not guaranteed. Some resources are limited in nature, and, therefore, the site providing these limited sources may not be able to satisfy all requests from all consumer sites, at least not with the quality of service that the consumer sites expect. Therefore, in order for a VO member site to reserve an exclusive use of the limited resource, this member site establishes an agreement with the providing member site. This agreement is used in both the SLA and resource partitioning model described previously.

In addition to defining the set of agreements that are possible in a VO, the CIP specifies the particulars that are available for an agreement, for example the quality of service levels, costs and limitations on the resource usage. Once established, a given resource agreement is referenced every time a request is made for that resource. The terms and conditions of the agreement, in addition to the costs and penalties, are continuously monitored by auditing functions located at both sites that are members to the agreement, i.e., the sites providing and consuming the resource.

In the cooperative data stream processing system of the present invention, the CIPs provide the creation templates that are used to create agreements between the provider and the consumer of the resource to be shared. These templates are used to create an actual agreement to access particular resources over a specified time interval. In addition, the CIPs define higher-level business interaction schemes between VO member sites. For example, the stakeholders of a given site can specify in the CIP not only the types of possible interactions between the VO member sites, but also the conditions under which agreements can or cannot be established. CIP terms are made within a VO-wide context and not just in the context of two member sites. In addition to describing the interoperation terms between member sites regarding resource sharing, the CIP also contains the technical communication details that are necessary to establish the communication channels among the various member sites. In one embodiment, the member sites that are members of a given VO are heterogeneous, for example having different data formats and security labels. To overcome issues related to handling heterogeneous systems, the CIP contains information regarding the kind of environment mapping required in order for the various types of sites within the VO to communicate.

Each site within the cooperative data stream processing system is not limited to being a member of only one VO. A given site can be a member site in a plurality of different VOs, both federated and cooperative. However, although member sites of a given VO interact and cooperate, member sites of different VOs are not allowed to interact directly with each other. If a given site attempts to use resources from multiple VOs, that site must act as a common point of contact to bridge data from one VO to another VO. Alternatively, that site can interact separately with each VO, merge the results internally and present the merged results to the user, subject to the constraints in the multiple VOs' CIP terms as agreed.

In one embodiment, a given VO can join as a member of another VO, forming a hierarchical VO structure. The joining VO honors any interoperation terms that are expressed in the CIP of the VO to which it joins. The joining VO uses the resources of its member sites resources to fulfill requests in accordance with the interoperation terms. How the member sites of the joining VO are used depends upon the type of VO. For a federated VO, the VO lead site delegates requests to the joining VO member sites as the lead site determines is appropriate. A cooperative VO that joins as a member of a larger VO requires extensive negotiation to specify in the CIP how the member sites of the cooperative VO can be used.

Figure 2:
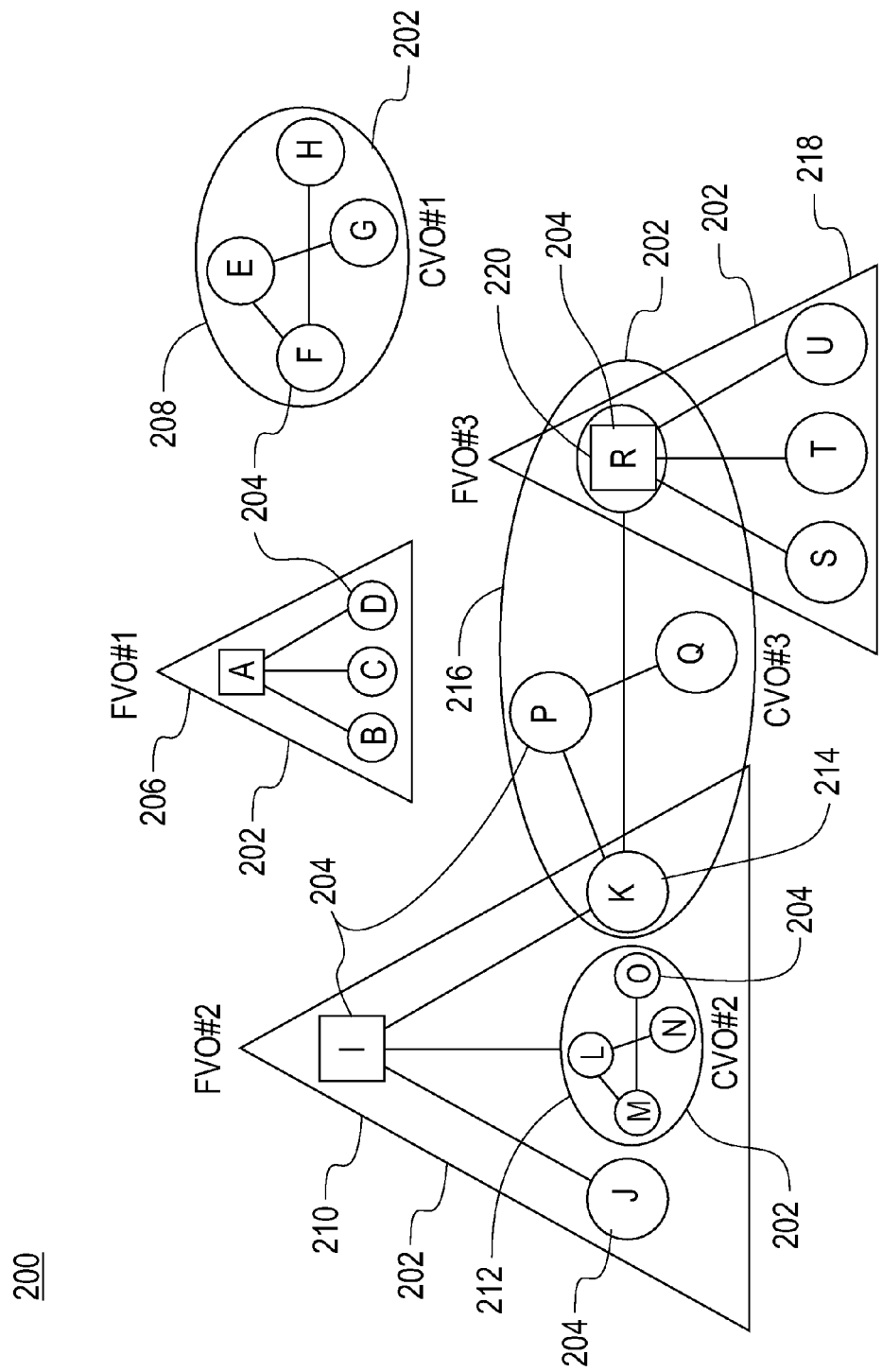
FIG. 2 is a schematic representation of an embodiment of peering relationships among sites within the cooperative system.

Referring to FIG. 2, an exemplary embodiment of a complex VO structure 200 in accordance with the present invention is illustrated. As illustrated, triangles represent federated VOs, and ovals represent cooperative VOs. Individual member sites are represented as circles, and federated lead sites are squares. The structure includes a plurality of VOs 202, and each VO contains a plurality of member sites 204. One of the plurality of VOs is an isolated federated VO 206 (FVO#1), and one of the plurality of VOs is an isolated cooperative VO 208 (CVO#1). Since the member sites in these VOs are not members of any other VOs, the only sites they are able to interact with are the other members of that same VO. For example, site A is only able to interoperate with sites B, C, and D. A second federated VO 210 (FVO#2) contains three member sites, lead site I and participant sites J and K. In addition, the second federated VO 210 includes a member that is itself a cooperative VO 212 (CVO#2). One of the member sites 214 (K) is also a member site of a cooperative VO 216 (CVO#3). This cooperative CO also includes three other member sites. Another federated VO 218 (FVO#3) is provided having four member sites, and the lead member site 230 (R) is also a member site of one of the cooperative VOs 216.

These mixed and overlapping hierarchical VO structures allow very complex structures to be created. Care is taken in constructing these structures to avoid creating operational issues. For example, the second cooperative VO 212, while organized as a cooperative VO, is joined to a federated VO 210. Therefore, the member sites of the joining cooperative VO agree to some degree to a higher level of control from the lead member site of the federated VO. Therefore, when a VO, either cooperative or federated, joins another VO, all member sites are involved in the decision as the decision affects all the member sites. In general, joining a cooperative VO causes less impact on the joining member sites, because the joining members retain a high degree of individual control. When a federated VO lead site 220 joins a cooperative VO 216, that lead site maintains a high degree of flexibility in delegating work to member sites in the federated VO, since the lead site retains control over the members of the federated VO. This ability of a lead site to delegate or off-load responsibilities enables the lead site to re-mission its resources to better fulfill any requests imposed on it due to its membership in the cooperative VO. Because the member sites (S, T, U) in the federated VO (FVO#3) are not in the cooperative VO (CVO#3) like the federated VO leader site, these sites are not able to interact directly with the other members of the cooperative VO (CVO#3) and must interact via the federated VO leader site (R).

Although sites and VOs may be members of multiple VOs simultaneously, they are not allowed to join a VO if this would cause a conflict with their existing peering relationships. For example, if a site is a member of a VO that requires it to share a given resource with a second site, that site is not allowed to join another VO that prohibits the sharing of this same resource with the same site, unless that site withdraws from the first VO. In one embodiment, a given site can choose which terms it wants to adhere to and which VO it wants to join.

As used herein, resource awareness refers to the discovery and retrieval of information about data sources, PEs and other kinds of resources, for example execution resources and active inquiries, among multiple collaborating sites. Each site stores information about such resources in relational or semantic data stores. In one embodiment, the instance of the data source management component on each site maintains low-level characteristics, e.g., delays and data rates, about data sources in a relational database and semantic descriptions in a semantic metadata store. The component that provides the discovery and retrieval of information about remote resources is the resource awareness engine. The resource awareness engine is in communication with the other components on a given site and is used by these components to retrieve desired information. For example, if a distributed job planner needs to know the kinds of data sources and PEs that are available at remote sites in order to produce global plans that utilize resources in a VO, the distributed job planner uses the resource awareness engine to access such information about other sites. The same applies to PEs and other kinds of resources as well.

The resource awareness engine provides a layer of indirection between endpoints. For example, a store or a client does not need to interact with the other end directly. The ability to eliminate the need for interaction between endpoints is particularly beneficial when there are many endpoints. The resource awareness engine provides a universal interface that endpoints use to communicate, and the resource awareness engine conceals underlying complexities and dynamics so that the endpoints always see the same interface. The addition or withdrawal of any site is handled by the resource awareness engine and becomes transparent to each client.

The resource awareness engine provides two kinds of interfaces. The first interface is a search interface, which is the "pull" mode of resource discovery. A client sends a query to the resource awareness engine, specifying the resources that are requested. The resource awareness engine searches and returns matching resources from multiple remote sites. The second interface is a publish/subscribe interface, which is the "push" mode of operation. Sites having resources to advertise and share with other sites publish the information to the resource awareness engine. Sites requiring resources subscribe to the resource awareness engine and specify the resources needed. The resource awareness engine actively pushes matching resources to the requesting sites. These two interfaces fulfill different needs within the system. The "pull" mode interface is suitable for clients, for example the failover site selection component, that request dynamically changing resources once in a while, only upon infrequent events, e.g., site failures, and only requiring the most up-to-date information. The "push" mode interface is suitable for clients, for example the Planner, that want to keep updated about continuously changing information, not just current but also past information. This interface keeps the client up to date about variations. A client may use a combination of "pull" and "push" interfaces for different types of resources as well.

Two different engine components in the resource awareness engine interact with system endpoints. These components are the exporter component of the resource awareness engine and the importer component of the resource awareness engine. The exporter component is responsible for interacting with a resource store that has data to publish or that is willing to accept external queries. The exporter component receives resources advertised by the store and relays these resources to the importer component. Alternatively, the exporter component receives queries from importer components, forwards these queries to the resource store and returns results. The importer component interacts with sites that request resources. The importer component receives queries from the sites and relays these queries to the exporter component. Alternatively, the importer component accepts subscriptions from sites and actively pushes matching resources back. In one example of data source discovery using the resource awareness engine, an existing single site component manages resource stores. When a client, for example a distributed planner, needs to discover remote data sources, the client sends a query to its local importer component. The importer component checks the CIP to identify sites that it can search. The importer component forwards the query to the exporter component of the identified sites. The exporter component checks the CIP to ensure the requesting site is allowed to access the resources. If so, the exporter component forwards the query to the Data Source Manager (DSM) component, which returns the results. Eventually the matching data source records are returned to the client.

Remote data sources can also be located using the push mode of operation of the resource awareness engine. For example, remote sites actively publish information about data sources through their local exporter components. The distributed job planner, or the DSM component that acts on behalf of the job planner, sends a subscription to its importer component. The importer component notifies other exporter components. Whenever matching data sources are published, exporter components actively push the matching data sources to the importer component and eventually to the client.

In one embodiment, the resource awareness engine provides the "pull" mode resource discovery by organizing the resource awareness engine components located on multiple sites into an overall hierarchy. The resource awareness engine component of each site chooses the resource awareness engine of another site as its parent. The two sites collectively form a tree structure. The hierarchy of the tree structure can naturally follow existing administrative relationships within an organization that owns multiple sites. This hierarchy can be used in a federated VO. Organizational peers, which are not subordinate to each other, negotiate among themselves and determine the hierarchy formation. This hierarchy formation is done in a cooperative VO. The exporter component at each site summarizes its resources, e.g., data sources, in aggregated forms and sends the summary to the importer component of its parent site. The aggregate resource summary is a condensed representation of the original resources, e.g., data source records, and supports attribute-based searching. The aggregate resource summary can take many different forms. For example, a histogram form can be used to summarize the DATA-RATE attributes of the video data sources of a site. Multi-resolution compression techniques can be used as well. A description of multi-resolution compression techniques is given in Deepak Ganesan et al., *Multi-resolution Storage and Search in Sensor Networks*, ACM Transactions on Storage, August 2005. The importer component of a parent site further aggregates the summaries from its children sites and sends these summaries up the hierarchy. Therefore, summaries are aggregated and propagated bottom-up through the hierarchy. The root resource awareness engine has a global summary of all the resources within the hierarchy, and each site has a branch summary of resources owned by its descendants.

The discovery of data sources initiates in the root resource awareness engine. An importer component from a client site sends a request to the importer component of a root site. The root site examines its own resources and the summaries of the resources of its children. The root site returns its eligible resources to the client and instructs the client to search the child branches of the root site that contain matching summaries. Through this mechanism, the client discovers eligible resources from all sites. In one embodiment, replication overlays are used to eliminate potential performance and failure bottlenecks at the root importer component.

The "push" mode of the resource awareness engine uses a semantic pub/sub system that matches events to subscriptions. Events are the semantic description of advertised resources in resource description framework (RDF) triples. Each triple has a subject, a predicate and an object and describes the relation between the subject and object. For example, Camera51 locatedIn NY indicates "Camera51" is located in "NY". A set of these triples can represent the semantic information of resources such as data sources. Subscriptions are RDF triple patterns. The RDF triple patterns are similar to triples, but some elements can be variables. ?x locatedIn NY represents any subject "?x" that is located in "NY". The semantic matcher receives events for resources from exporter components and subscriptions from importer components. The semantic matcher uses a semantic reasoner to deduce facts from ontologies, which contain formal representations of domain knowledge such as the location relationship of all cities and states in the U.S., and decides which events match to which subscriptions. An example of a semantic reasoner is described in J. Zhou, L. Ma, Q. Liu, L. Zhang, and Y. Yu. Minerva, *A Scalable Owl Ontology Storage and Inference System*, The First Asian Semantic Web Symposium (2004).

A variety of failures can occur in cooperative data stream processing systems. Individual PEs or individual applications executing on the nodes of a given site can fail. Various system components, both hardware, e.g., storage and computation nodes, and software, e.g., INQ, DSM, can also fail. The failure of system components will at a minimum cause the degradation of the capability of a site and at worst cause the failure of the entire site. Even partial failures of system components can dramatically impact the capacity of a site.

Failure recovery is important both within a site and between sites. Given the ability to recover across sites, say from a checkpoint, the technology to recover within the same site also exists. Therefore, the emphasis is on cross-site or inter-site failure recovery, and the existence of certain intra-site failure recovery functionality is assumed when needed. Multi-site failure recovery requires mechanisms for supporting recovery and policies governing issues such as site selection and frequency of checkpoints.

Support of failover depends on the types of applications being executed. Many non-critical applications can be terminated under appropriate circumstances. These applications need no special support for recovery when the application or the nodes on which the applications run fail. Applications that are more important, yet not critical, can be restarted from scratch upon a failure without significant loss to users. A relatively small but critical fraction, however, should be resumed after a failure without loss of state. For these, failure recovery techniques are required. Suitable failure recovery techniques are known and available in the art and include process-pairs, for examples as described in Jim Gray and Andreas Reuter, *Transaction Processing: Concepts and Techniques*, Morgan Kaufmann (1992), and checkpointing, for example as described in Theo Haerder and Andreas Reuter, *Principles of Transaction-Oriented Database Recovery*, Readings in Database Systems (2nd ed.), pages 227-242, Morgan Kaufmann Publishers Inc., San Francisco, Calif., USA (1994). These techniques work well for recovering within a site. In addition, these techniques can be used to run critical applications on another site, either in parallel (process-pairs) or upon a failure (checkpointing). However, the overhead of maintaining the state across multiple sites will be substantially higher than within a more tightly-coupled site.

To handle failures of hardware system components, two mechanisms are available. The first mechanism is load shedding and rebalancing within one site. After a failure of some computational nodes, low-priority jobs can be killed or suspended to make room for high-priority ones. High-priority jobs can also be redistributed among the remaining nodes, thus rebalancing the workload on the functioning nodes. The second mechanism is inter-site offloading. If the workload of important jobs in a site exceeds the capacity of the remaining nodes, the site can shift some of its high-priority jobs to other sites. In one embodiment, the sites pre-arrange CIPs among them to determine which jobs to offload and how to offload these jobs. Executing in another site faces heterogeneity in available data sources, execution environments, competing execution priorities and other issues. Therefore, executing jobs on alternative sites preferably is used as a last resort. In rare instances, an entire site may fail as the result of a natural disaster such as floods or earthquakes or the simultaneous failure of each instance of a critical system component. The primary difference between partial and total site failure is that in the former case, the affected site can initiate recovery actions, while in the latter case, another site must detect and respond to the failure. The choice of which site (or sites) backs up a given site is negotiated in advance, based on the CIP(s). Critical data, such as the state necessary to run specific applications and the stored data upon which those applications rely, are copied to the back-up site(s) in advance. Any applications that are critical enough to be checkpointed periodically or run in parallel via process-pairs are coordinated across the sites.

The CIPs between sites provide for significant flexibility in deciding how to respond to failures. A plurality of factors is considered in making this decision regarding how to respond to failures within the system. One factor looks at which site or sites should back-up a given site. Some sites are excluded from serving in a back-up capacity due to either unwillingness or incompatibility. If multiple sites are available as satisfactory back-ups, a subset of these potential sites is identified. In one embodiment, site reliability and associated costs are taken into consideration when identifying the subset. The jobs or work associated with the failed site are divided among the sites in the identified subset. In addition, a determination is made regarding whether the assignment of back-up sites is optimized by each site individually or decided for the benefit of a group of sites as a whole. The assignment of jobs will be handled differently in a federated VO versus a cooperative VO. Failure recovery or failure tolerance can also be provided through checkpointing. For a given application, a determination is made about how often and under what conditions checkpoints should take place. In one embodiment, the current state is checkpointed more frequently to support intra-site recovery than for inter-site recovery as checkpointing for inter-site recovery entails higher overhead costs. The decision regarding how often and how much back-up data to store weighs the need for a sufficient amount of reliable data against the storage limitations of each site and the ongoing storage needs of each site. For replicated persistent data, value-based retention interacts with the reliability of the data as described in Ranjita Bhagwan et al., *Time-Varying Management of Data Storage*, First Workshop on Hot Topics in System Dependability, June 2005. In addition, each extra copy of backed-up data takes space away from a site's own data, some of which may have only one copy.

Exemplary embodiments of the cooperative data stream processing system in accordance with the present invention manage the inherent heterogeneity of the multiple collaborating sites. Each site can have a different operating environment, in terms of the runtime environment, type system, security and privacy policy set, user namespace, among other aspects. These points of differentiation are managed to allow the sites to interoperate.

Each site within the cooperative data stream processing system has its own runtime environment, including PEs, stored data, and type system, with potentially different names, formats, functions or interpretation. For example, a first site uses a 5-character string for type the zip code, and a second site uses a full 9-digit zip code. In addition, a third site might not use the zip code at all. The present invention utilizes transformation and mapping rules as well as routines between sites to ensure that collaborative applications use PEs, stored data and types correctly across sites. In addition to inter-site variability in the representation and formatting of data, PEs, stored data and type systems evolve over time. The version of a given data set can differ from one site to another. Since applications using different versions of the same PE, stored data, or data types can co-exist, an evolution history is required. Suitable evolution histories use mechanisms such as versioning. The transformation and mapping should also handle such evolutions, both intra-site and inter-site.

Another source of heterogeneity among the sites comes from the security and privacy policies of each site. Collaborating sites can have identical or different security and privacy policies. When a single organization operates many sites, or all sites have high degrees of mutual trust and uniformity, a single security and privacy policy can be adopted under a common user namespace. The cooperative data stream processing system assumes either lattice-based secrecy, as described in Ravi Sandhu, *Lattice-Based Access Control Models*, IEEE Computer, November 1993, or integrity policy models, as described in IBM, Security in System S, http://domino.research.ibm.com/comm/research_projects.nsf/pages/system_s_sec-urity.index.html (2006). In one embodiment, each site within the system is provided with an understanding of the format and implied relationships of the security labels used by all sites within the system. The access rights and restrictions encoded within a security label are uniformly applicable throughout all the sites.

When multiple sites belonging to different organizations collaborate, however, uniform policies may not be feasible. In one embodiment, each site within the system defines its own security and privacy policies. All sites define secrecy levels and confidentiality categories for their subjects and objects; however, the numbers of secrecy levels, sets of categories and their meaning and interpretation vary from site to site. The user namespace also varies and can be completely separate from one site to another. In order to account for variations in security and privacy policies, policy translation and mapping are used. For example, in a collaborative hurricane response and recovery system, a given private organization uses two secrecy levels, public and organization-confidential, and no categories. A governmental agency, for example the Federal Emergency Management Agency (FEMA) dealing with the same situation uses four secrecy levels (unclassified, confidential, secret and top-secret) and a large set of categories, including a category Organization-NDA assigned to subjects to deal with organization-confidential information. The policy translation and mapping rules define that organization sites provide organization-confidential data only to agency subjects cleared to at least the confidential level and having the category Organization-NDA.

Figure 3:
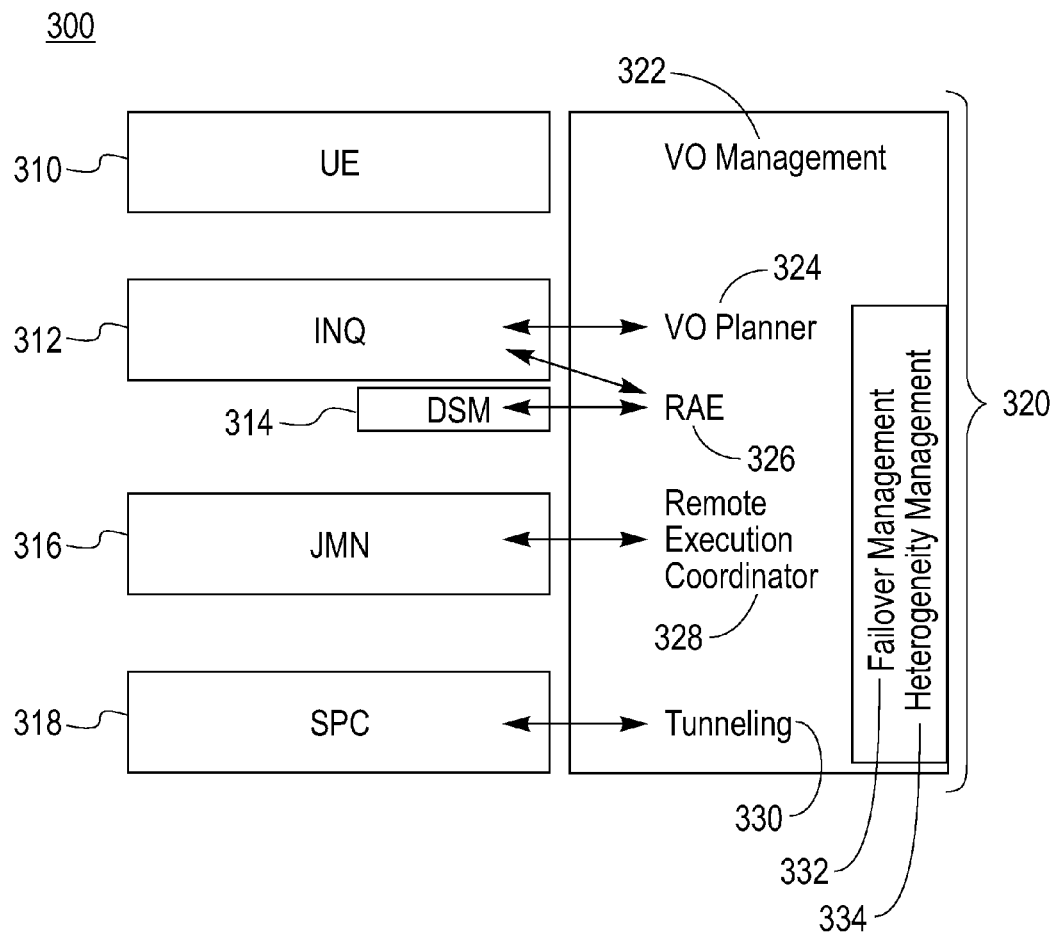
FIG. 3 is a schematic representation of the system architecture in combination with an embodiment of multi-site system functions.

An architecture was described above for the individual components supporting cooperation in the cooperative data stream processing system. Referring to FIG. 3, an exemplary embodiment of the functions that facilitate cooperation in combination with the system architecture 300 is illustrated. The plurality of functions 320 supporting cooperation are aligned with the architectural components to which each function relates. In one embodiment, each site runs an instance of each component of the architecture and employs the set of functions as illustrated.

A first function is VO management 322, which is utilized by the user experience component 310. VO management has the greatest degree of direct interaction with end users, for example site administrators. Included within VO management are CIP management for activating, deactivating and maintaining CIPs, VO membership management for tracking which sites are in a VO and the roles of each site within a given VO, agreement management for enacting agreements with other the sites and VO services including accounting and SLA monitoring. Administrators for each site and each VO interact directly with VO management to create and update CIPs.

The plurality of functions also includes a VO planner 324 that works with the INQ component 312 to facilitate inter-site planning. The VO resource awareness engine (RAE) provides information about available resources and interacts with DSM 314 as well as the INQ component 312. The remote execution coordinator (REC) 328 extends JMN layer 316 to the multi-site case by supporting distributed jobs. The tunneling function 330 extends the data fabric component of the stream processing core (SPC) 318 across sites by transmitting data from a PE on one site to a PE on another. In addition to functions that integrate with one of the layers in the system architecture, the plurality of functions 320 also includes functions that interact with multiple components in the core, i.e., single-site, architecture. The VO failover management (FM) 332 handles back-up site arrangements, check pointing and recovery after failure. In addition, VO FM 332 incorporates heartbeat management (not shown) for tracking the availability of sites. The VO heterogeneity management (HM) 334 function manages the mapping and translation for types, schemas, ontologies and security and privacy labels, among others.

The components and associated functions illustrated in FIG. 3 are replicated on each site within the system. In addition, the various components can appear as either a participant or a lead within a VO. Participants interact with other components on a site and relay various requests to the leads for processing. For example, in a federated VO, a federated plan lead component takes an inquiry, builds a distributed plan and invokes appropriate components on each participating site to deploy that part of the plan.

Figure 4:
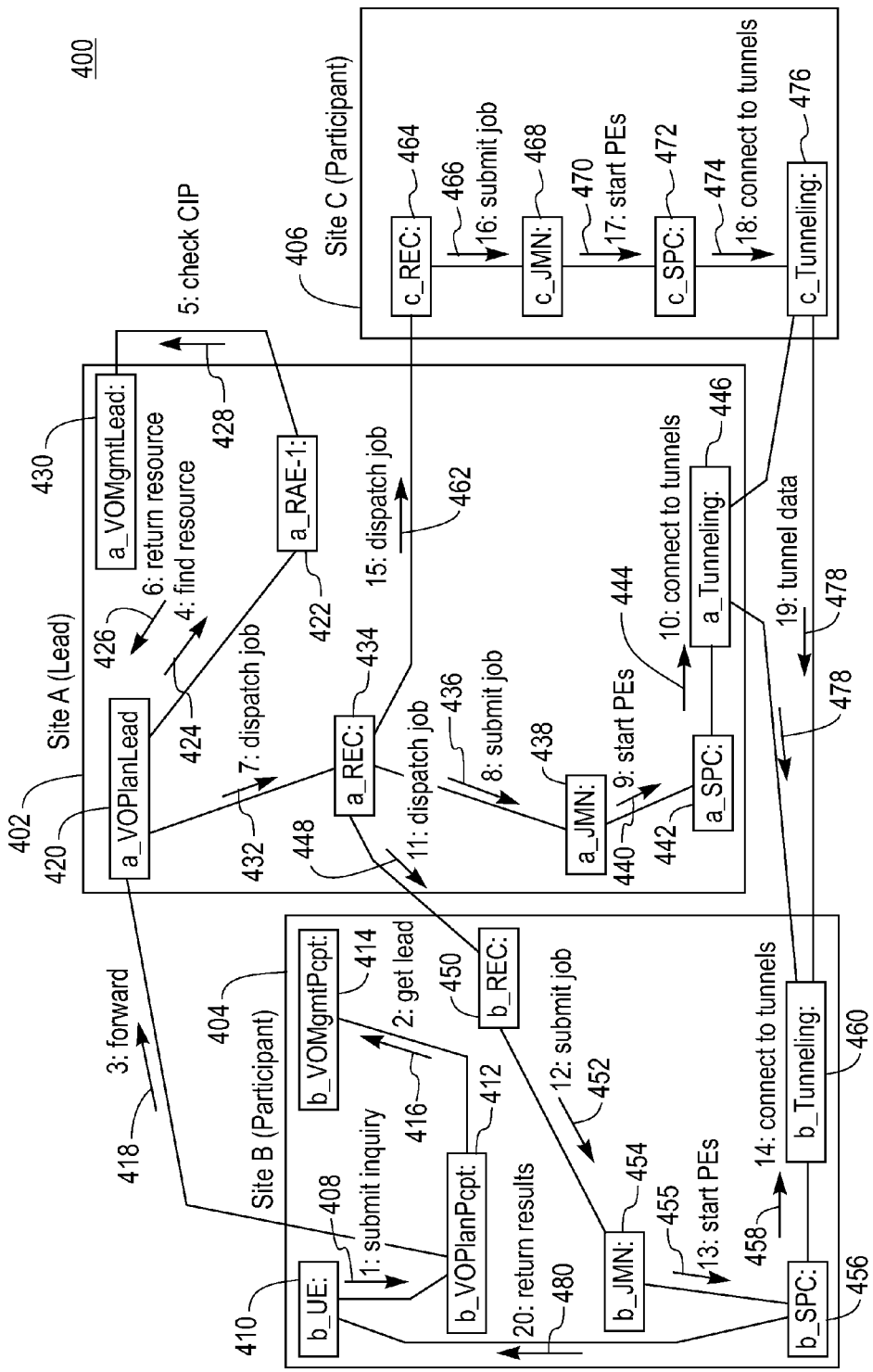
FIG. 4 is a schematic representation of an embodiment of inquiry processing using the cooperative data processing system of the present invention.

Referring to FIG. 4, an exemplary embodiment of a distributed planning scenario 400 within a federated VO using SLAs in accordance with the present invention is illustrated. The federated VO includes a lead site 402, a first participant site 404 and a second participant site 406. An inquiry 408 is submitted from the instance of the user experience (UE) component 410 on the first participant site 404 and is received by the instance of the VO plan participant 412 on the same site. The VO plan participant 412 obtains from the VO management participant the identification of a plan lead 416 for the submitted inquiry and forwards the inquiry 418 to the VO plan lead 420 on the lead site 402. The VO plan lead examines the inquiry and sends a resource request 424 to the VO RAE-I 422 for information about where appropriate resources are available. The VO RAE-I 422 sends a request to check the CIP 428 to the VO management lead 430 to determine whether the CIP allows particular resources to be shared. The VO RAE-I 422 returns a list of appropriate resources 426 to the VO plan lead 420. The appropriate resources are available for use for plan inclusion. From this list of possible resources, the VO plan lead 420 chooses providers for needed resources, and dispatches the job 432 to the remote execution coordinator (REC) 434 on the lead site 402. The REC 434 on the lead site recognizes and separates the portions of the job that are destined for execution on other sites within the VO. The job portion that is destined for execution locally on the lead site is submitted to the local JMN 438 for execution. The local JMN 438 starts the PEs 440 using the local SPC 442 on the lead site. These PEs are connected to the tunnels 444 using the tunneling function 446 local to that site to return SDOs to the sites accessing them. Some of the above described details may vary in other embodiments. For example, a DSM component may send resource requests on behalf of the VO plan lead to retrieve data source information, and the VO plan lead asks its DSM for both remote and local data source information.

A similar job submission sequence is repeated once for each remote or participant site. For the first participant site, the REC 434 on the lead site 402 dispatches the appropriate the job portion 448 that is destined for execution on the first participant site 404 to the REC 450 on the first participant site. This REC submits the jobs 452 to its local JMN 454 for execution. The local JMN 454 starts the PEs 455 using the local SPC 456 on the first participant site. These PEs are connected to the tunnels 458 using the tunneling function 460 local to that site to return SDOs to the sites accessing them. Similarly, for the second participant site 406, the remote execution coordinator (REC) 434 on the lead site 402 dispatches the appropriate the job portion 462 that is destined for execution on the second participant site 406 to the REC 464 on the second participant site. This REC submits the jobs 466 to its local JMN 468 for execution. The local JMN 468 starts the PEs 470 using the local SPC 472 on the second participant site. These PEs are connected to the tunnels 474 using the tunneling function 476 local to that site to return SDOs to the sites accessing them. The SDOs are tunneled 478 as they are produced through to the site originating the inquiry. The SPC 456 on the first participant site, i.e. the site originating the inquiry, returns results 480 to the user as the results are obtained.

Interoperation among a plurality of sites within a given cooperative data stream processing system of the present invention requires distributed planning among the sites, inter-site and intra-site resource awareness and distributed execution and failure recovery. With regard to distributed planning, a VO planner is implemented that can utilize data sources and PEs from each one of the plurality of sites in the VO and that can produce distributed plans. The VO planner accepts inquiries that describe the desired final results in inquiry specification language (ISL). In one embodiment, the semantic description of the content of remote data sources and the required input and output streams of PEs are represented using a Web ontology language (OWL) files as described, for example in W3C Recommendation, Web ontology language (OWL), February 2004. These OWL files are replicated at the site containing the VO planner. Since the semantic descriptions are relatively static, these files do not change frequently. When a site joins a VO, that site can copy these files over to the site for the VO planner site.

The VO planner, having received the inquiries, optimizes and balances between multiple objectives such as quality of results, resource utilization, security risks, communication delay and bandwidth between sites in order to plan the execution of the inquiries. An example of suitable planning is described in Anton Riabov and Zhen Liu, *Planning for Stream Processing Systems*, Proceedings of AAAI-2005, July 2005. In one embodiment, multiple Pareto-optimal distributed plans are produced in the form of flow graphs, which consist of PEs and data sources interconnected together. These plans have different performance vs. cost tradeoffs and can be provided to either the user or a distributed scheduler to decide which plan to deploy. The VO planner partitions the chosen plan into a plurality of sub-plans. Each sub-plan is assigned to a site within the cooperative data stream processing system for execution. The VO planner also inserts tunneling PEs into the sub-plans. These tunneling PEs handle inter-site transport of data streams.

Implementations of the resource awareness engine allow any site within the cooperative data stream processing system to discover desired information, for example, available data sources, PEs and resources, from other sites within a common VO. In one embodiment, a pull mode is used to discover the desired information. The pull mode utilizes two components, a server and a resolver. The server functions as the exporter. An instance of the server resides at every site and produces summaries about information at that site. The resolver functions as the importer. A client, e.g., a VO planner or its DSM acting on behalf of the planner, requesting information sends the appropriate query to its local resolver. By checking the CIP, the resolver knows which one of a plurality of servers is the root server. The resolver forwards the request to the root server, which directs the resolver to search through the server hierarchy. In one embodiment, replication overlays are used in addition to the hierarchy to avoid a bottleneck at the root server and to increase the speed of the search. Therefore, a given server within the hierarchy replicates the branch summaries of its siblings, its ancestors and its ancestors' siblings. Upon receiving a query, a server evaluates the query against replicated summaries and directs the resolver to search corresponding remote servers when matches are identified. Such replications let each server receive summaries that combine together to cover the whole hierarchy. Therefore, the resolver can send the request to any server.

In one embodiment, a push mode is used to discover the desired information. The push mode includes three modules, the match server, the subscriber acting as importers and the publisher acting as exporters. The match server provides three functions to subscribers—subscribe, unsubscribe and renew. Each subscription has an associated lifetime. After the lifetime expires, the associated subscription is removed from the system. In one embodiment, the subscriber submitting the subscription specifies the associated lifetime. In addition, the subscriber can renew the lifetime of a previous submitted subscription. In one embodiment, a single centralized server handles all subscriptions and matches published events against existing subscriptions.

The single centralized server optimizes the matching for a plurality of subscriptions by exploiting the common triples in the subscriptions. When several subscriptions all have the same triples, the centralized server reasons once and uses the intermediate results for all subscriptions. The centralized server maintains a mesh of distinct triple patterns from all subscriptions. The distinct triple patterns in the mesh are ranked selectivity, i.e., how many potential triples match a given triple pattern, and popularity, i.e., how frequent a given triple pattern appears in subscriptions. An order of evaluation of the triple patterns is determined that minimizes matching response time. As existing subscriptions expire and new subscriptions are submitted, the ranked mesh is updated accordingly.

Figure 5:
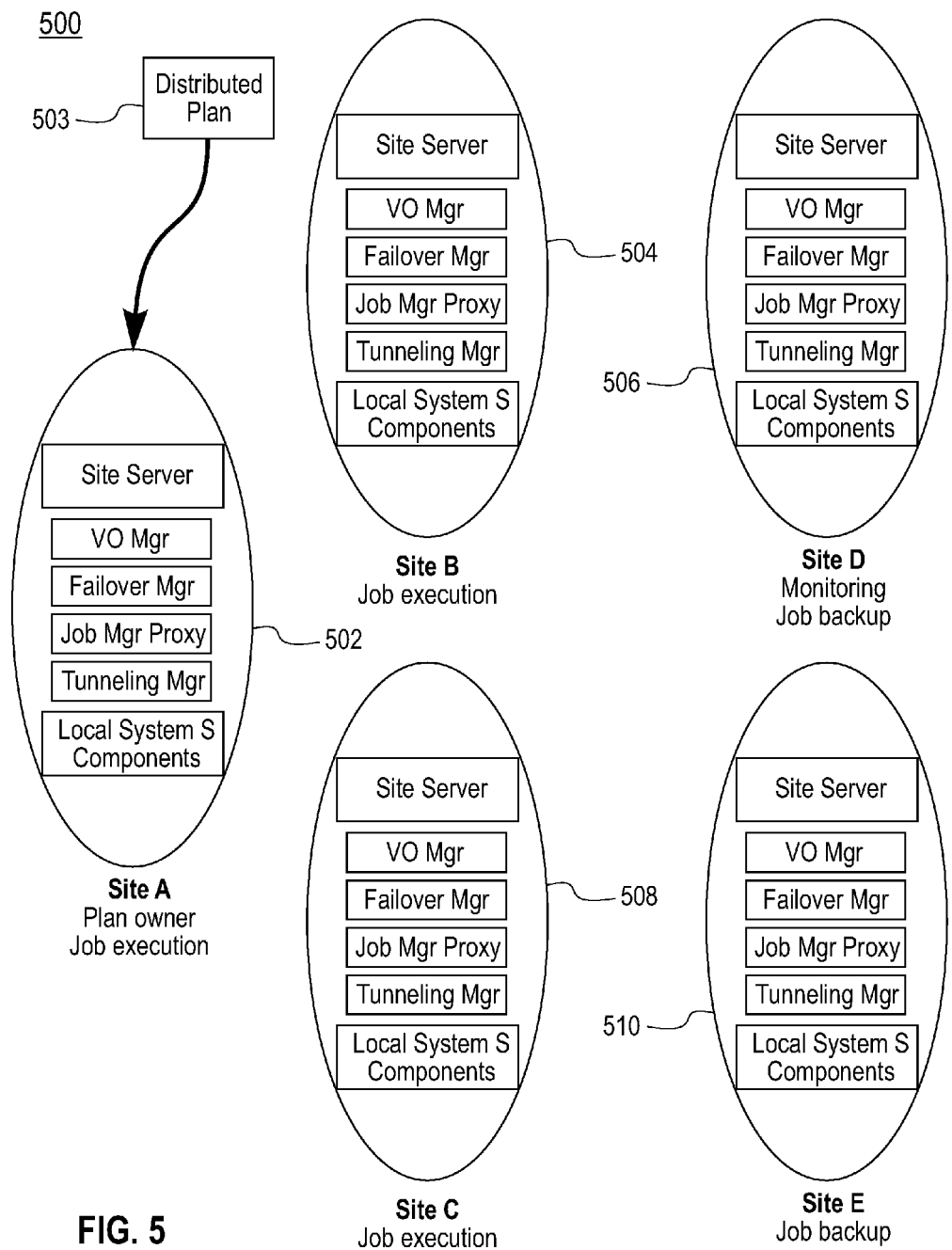
FIG. 5 is a schematic representation of an embodiment of site arrangements to provide for inter-site system failover.

In one embodiment, monitoring and recovery are provided for cooperating stream processing jobs distributed across multiple sites. Individual job failures within a single cooperative data stream processing system site are recoverable within that site. However, a failure of an entire site requires distributed support. Referring to FIG. 5, an exemplary embodiment of a site failover arrangement 500 for use with the cooperative data stream processing system in accordance with the present invention is illustrated. As illustrated, the cooperative data stream processing system includes five sites. These five sites work cooperatively to execute a distributed plan for supporting failure recovery. Each site provides one or more of a plurality of functions for failure recovery. A first site 502 functions as the failure recovery plan owner. The distributed plan 503 is communicated to the plan owner site 502, and the plan owner site drives the execution of the distributed plan job execution. A second site 504 and a third site 508 provide for job execution by hosting jobs that are part of the distributed plan, and a fourth site 510 provides for job back-up to host jobs from failed job execution sites. A fifth site 506 provides monitoring of other sites for site failure. Some of the sites can provide more than one function. For example, the first site functions as the plan owner and as the execution site for some of the jobs included in the plan. Similarly, the fifth site 506 monitors the execution sites and functions as a back-up execution site. The input to the five sites is the representation of a distributed plan 503, which is assumed to be executing to satisfy an inquiry entered by a user of the cooperative data stream processing system. The distributed plan describes how the inquiries are divided into individual jobs that will run on the different sites within the system.

In one embodiment, each site contains a single instance of the components of the architecture of the cooperative data stream processing system. In addition each site, in order to support distributed operation, includes a site server, a VO manager, a failover manager, a job manager proxy and a tunneling manager. The VO manager manages the sites that are available to play monitoring and back-up roles in support of the distributed plan. In addition, the VO manager manages agreements between sites. The failover manager chooses the specific sites to assume monitor and back-up roles and orchestrates the monitoring and notification of site failures between the sites. The job manager proxy is a wrapper around the JMN component of the cooperative data stream processing system, allowing jobs to be invoked remotely from other sites. The tunneling manager provides the mechanism to transport data streams between sites.

In one embodiment, the distributed plan is interpreted by a site within the system that will drive the execution of the plan and that will act as the plan owner. This site can be a lead site in a federated VO or a peer site in a cooperative VO that has taken on a leadership role for this distributed plan. The set of sites that will function as the job execution sites are specified in the distributed plan. Next, the monitoring sites that will monitor the health of the job execution sites are chosen. This selection can be hard programmed into one or more sites or can be selected, for example, using the VO manager located on the plan owner site. This VO manager checks for sites that are willing to provide monitoring capability according to the CIP associated with the VO. Specific sites are chosen through interaction between the failover manager on the plan owner site and failover manager counterparts on other sites. Agreements to monitor are created between the plan owner site and the VO managers of the monitoring sites. The selection of job back-up sites that take over the execution of critical jobs upon a site failure is made through methods similar to the selection of monitoring sites. In one embodiment, the selection of back-up sites is made ahead of time in advance of a site failure. Alternatively, the selection is deferred until a failure occurs, and back-up sites are chosen on demand. Agreements to back-up are also obtained from these sites.

In preparation for the execution of the distributed failover plan, heartbeat monitoring is initiated by the failover managers on the appropriate sites. In addition, the tunneling managers on the appropriate execution sites are alerted to prepare for tunneling in accordance with the tunneling requirements defined in the distributed failover plan. Because the distributed failure plan has broken the logical plan into disjointed fragments, the tunneling requirements tell the tunneling managers how to associate the tunneled streams to the PEs on their respective sites. Separate jobs are deployed by the tunneling manager instance located on each site involved to provide the necessary tunneling support. In further preparation, the actual jobs that implement the distributed failover plan are deployed to the sites that will host those jobs. The plan owner site uses the job manager proxy instance located on each of the hosting sites to deploy the jobs. Upon successful initiation of these jobs, the execution of the distributed plan begins. Data flow between PEs on each hosting site, and these PEs perform their analysis on the data. Data streams also flow from certain PEs on one originating site through tunnels to other destination sites and are routed to the appropriate PEs on these destination site. In addition, the applications that constitute the distributed plan are able to optionally checkpoint state that may be used later in order to recover from a failure.

When an execution site fails, the failure is detected through the heartbeat monitoring performed by the monitoring site responsible for this execution site. In one embodiment, the failover manager instance on the monitoring site notifies the failover manager instance on the plan owner site of the failure. The plan owner site works to recover any critical jobs that were executing on the failed site. In one embodiment, the owning site uses its representation of the distributed plan and initially halts any tunneling that involves the failed site. The sites that were exchanging data with the failed site are informed to stop all tunneling activity with the failed site. New monitoring agreements are created for monitoring, if necessary, and heartbeat monitoring is initiated on the back-up sites. The tunneling manager instances on new, i.e., back-up, execution sites and on the execution sites affected by this site failure are notified to prepare for tunneling, resulting in new or reconfigured tunneling jobs. The critical jobs from the failed site are deployed on one or more back-up sites, and the execution of these jobs is resumed on these sites. In one embodiment, the execution of these jobs is resumed by reading checkpointed state from distributed storage. The distributed plan is now restored to its intended state. In one alternative embodiment, the failure notification is configured to directly notify the back-up sites, allowing these sites to initiate recovery. In this embodiment, there is no plan owner other than the site that failed. Therefore, instead of running a job having an owner, which spawned it, a back-up site has the information to recover a failed job even though it did not initiate the job earlier.

The cooperative data stream processing system architecture supports multiple cooperation paradigms, including federated and cooperative (peer-to-peer) VOs. In addition, hierarchical layers of VOs provide arbitrary scalability. The distributed planning component of the cooperative data stream processing system is significantly more elaborate and flexible than the Grid models. Failure recovery utilizes other sites to survive both partial and total site failures and to enable critical processing to continue. Unlike Grid computing, the cooperative data stream processing system is intended to run under a state of overload and, potentially, to drop processing or data as dictated by overall system priorities.

The cooperation among cooperative data stream processing system sites encompasses a variety of interaction models, from loosely coupled to tightly integrated. These various models address different levels of cooperation needs of sites with varying degrees of trust relationship, and inter-site heterogeneity. The cooperative data stream processing system supports generic application-specific processing rather than database operations, a more difficult problem due to higher complexity, development costs and times to completion. A discussion is found in Michael Stonebraker, Ugur Çetintemel, and Stanley B. Zdonik, *The 8 Requirements of Real-Time Stream Processing*, SIGMOD Record, 34(4):42-47 (2005). Moreover, the cooperative data stream processing system has an Inquiry Specification Language that allows users to specify applications declaratively at the semantic level, allowing users to focus on application level tasks, rather than deal with the complexity of finding the optimum set and interconnection of data sources and PEs. With regard to failure recovery, the cooperative data stream processing system emphasizes policies such as optimizing the selection of back-up sites, providing a balance between the goals of different sites and incorporating existing underlying failure recovery mechanisms.

Failure recovery is important both within a site, intra-site, and between sites, inter-site. Given the ability to recover across sites, say from a checkpoint, the technology to recover within the same site also exists. The interesting challenges for multi-site failure recovery include the mechanisms for supporting recovery and the policies governing issues such as site selection and frequency of back-ups.

Support of failover depends on the types of applications that are operating and that may need to be recovered. Non-critical applications can be terminated under appropriate circumstances and require no special support for recovery when the applications or the nodes on which the applications run fail. Applications that are more important, yet not critical, can be restarted from scratch upon a failure without significant loss to users. A relatively small but critical fraction, however, should be resumed after a failure without loss of state. For these, one can use well-understood failure recovery techniques, such as process-pairs or checkpointing.

In one embodiment, handling failures of hardware system components involves two mechanisms. The first mechanism is load shedding and rebalancing within a single site. After a failure of some nodes within the site, low-priority jobs are terminated or suspended to create room on other nodes for the execution of high-priority applications. High-priority applications can also be redistributed among the remaining nodes, thus rebalancing the workload on the functioning nodes. The second mechanism is inter-site offloading. If the workload of important jobs on a given site exceeds the capacity of the remaining nodes on that site, the site shifts a portion of its high-priority jobs to other sites within the system. In one embodiment, the sites pre-arrange peering relationships expressed as Common Interest Policies (CIPs) among them to determine which jobs to offload and how to offload them. Transferring the executing of jobs or applications between sites raises issues of heterogeneity in available data sources, execution environments, competing execution priorities, among other issues. Systems and methods for failure recovery in accordance with the present invention provide the necessary changes or compensations to handle heterogeneity.

In addition to partial site failures, an entire site may fail. Total site failure can result from natural disasters such as floods or earthquakes, or the simultaneous failure of each instance of a critical system component. The primary difference between partial and total site failure is that in the former case, the affected site can initiate recovery actions, while in the latter case, another site is needed to detect and to respond to the failure. The choice of which site (or sites) backs up a given site is negotiated in advance, for example based on the CIPs among the sites. Critical data, such as the state necessary to run specific applications and the stored data upon which those applications rely, is copied to the back-up sites in advance. Any applications that are critical enough to be checkpointed periodically or run in parallel via process-pairs are coordinated across the sites.

Just as cooperating sites use policies to describe the constraints of their interaction, policies in the form of CIPs are used to define the roles that a site is willing to play in failure scenarios. In one embodiment, the failover site roles described herein are both defined and constrained by the CIP. Other site roles are assumed within the context of the work executing across multiple sites.

In one embodiment, distributed plans, e.g., for job sharing and failure recovery, are interpreted by a site that drives the execution of the plan and that acts as the plan owner. This site could represent the lead site in a federated VO or a peer site in a cooperative VO that has taken on a leadership role for this distributed plan. In one embodiment, the site that acts as the plan owner is referred to as the owning site. A set of job execution sites is specified in the distributed plan. The sites that will monitor the health of the job execution sites are chosen using the CIPs. The VO manager on the owning site checks which sites are willing to provide monitoring capability according to the VO's CIP. Specific sites are chosen through interaction between a failover manager on the owning site and the failover manager counterparts on other sites. Agreements to monitor are created between the owning site and the VO managers of the sites providing the monitoring.

Back-up sites, which will take over the execution of critical distributed jobs upon a site failure, are chosen in a similar fashion to the previous step. In one embodiment, back-up sites are chosen in advance. Alternatively, the selection of back-up sites is deferred until a failure occurs, and the back-up sites are chosen on demand. When back-up sites are chosen in advance, agreements to back-up are obtained. In preparation for the execution of the distributed plan, a number of actions are taken. Heartbeat monitoring is initiated by the failover managers on the appropriate sites. Tunneling managers on the appropriate execution sites are alerted to prepare for tunneling according to the tunneling requirements defined in the distributed plan.

After the actual jobs that implement the distributed plan are deployed to the sites that will host them, and other owning sites deploy additional plans to their execution sites, a set of sites are actively interoperating. Data flows between PEs on each hosting site, and PEs perform their analysis. Each PE may optionally checkpoint its state if stateful recovery of the PE after a failure is desired. Streams also flow from certain PEs on one site through tunnels to other sites and are routed to the appropriate PEs on the destination site. This "normal" operating state for the distributed execution of jobs on a plurality of cooperating, independent, distributed sites is what is maintained by the failover mechanism.

When a given primary site fails, the failure is detected, for example through the heartbeat monitoring performed by the monitoring site associated with that primary site. The failover manager on the monitoring site notifies the failover manager on each site that owns a distributed plan that overlaps with the failed primary site, e.g., that are executing applications associated with the same jobs running on the failed primary site or that are otherwise cooperating with the failed primary site. These can be referred to as affected cooperating sites, for example in either a cooperative or federated VO. The owning sites recover any critical jobs that were executing on the failed site. In order to recover, the owning sites refer to the distributed plans they own. First, the owning sites halt any tunneling that involves the failed site, informing the sites that were exchanging data with the failed site to stop all tunneling activity with that site. Next the owning sites create new agreements for monitoring new execution, i.e., back-up and monitoring sites, if necessary, and heartbeat monitoring is initiated on the back-up sites. Next, the owning sites inform the tunneling managers on the new execution sites, and execution sites affected by this failure, to prepare for tunneling, resulting in new or reconfigured tunneling jobs. Finally, each owning site redeploys the critical jobs from the failed site to the back-up sites, where the jobs resume their execution, reading checkpointed state of the PEs from distributed storage. Each distributed plan is now restored to its intended state.

In the previous case, the owning site decides what actions to take on-demand. For example, the identification of exactly which sites to execute the failed job is determined after the failure. When the environment changes dynamically and available resources to execute jobs vary over time, deferring this decision until failure happens is an adequate approach.

In another embodiment, these decisions regarding what actions to take, for example identifying which sites to execute the failed job, are made in advance. Before a distributed job is executed, the VO planner produces contingency plans, specifying which other execution sites could recover which jobs. When the owning site asks a first site to monitor a second site, the planner also sends the contingency plan to the first site. When the first site detects the failure of the second site, the first site acts based on the contingency plan directly, e.g., restarting the job at a pre-determined third site, without going back to the owning site. This mechanism is useful when the distributed job is critical and requires minimum interruption. In this embodiment, higher demand is placed on the VO planner, which must consider different site failure scenarios and produce contingency plans beforehand. In this embodiment, the owning site is not involved in the decision loop. It is up to each monitoring site to decide how to recover failed jobs based on the contingency plan.

False alarms can occur in heartbeat monitoring. When the communication link between the first and second sites is down, for example, the first site can erroneously conclude that the second site is down and incorrectly trigger recovery actions such as restarting a duplicate job at the third site. In one embodiment, a collective monitoring mechanism is used. To differentiate failure in the second site and failure in the links between sites, the first site can ask several other sites to also heartbeat with the second site. The other sites likely will use different network links to heartbeat with the second site. The other sites notify the first site about their heartbeat results. Only when the first site fails to receive a heartbeat for the second site from all the other sites while still receiving heartbeats from the other sites, does the first site conclude that the second site has actually failed.

In addition to jobs, the same heartbeat and recovery mechanisms can be used to recover failed system components. These components include the components that provide for the operation and monitoring of the cooperative data stream processing system of the present invention. In one embodiment, a heartbeat is used to monitor the liveliness of system components. For example, in a cooperative VO, one site can be elected to host the VO management lead component, which is critical to the resource sharing among sites. Another site that has the same VO management lead component installed but not activated, can keep heartbeating the active VO management lead component, using possibly collective heartbeating. When the active VO management lead fails, it can activate its own copy. Thus the VO management function is still available within the VO.

Exemplary embodiments of the failure recovery framework for cooperative data stream processing systems in accordance with the present invention utilize both intra-site back-up mechanisms and inter-site back-up mechanisms. Failures, including software failures, hardware failures, application failures and component failures degrade the capabilities of a site. Therefore, cooperative data stream processing systems dynamically adjust resource allocations within each site, i.e., intra-site, to support the highest priority jobs first. Upon failures within a given site, lower priority applications are terminated to make resources or nodes within the site available for higher priority applications. Applications with high priority are redistributed among the remaining nodes of the site. Some applications are simply restarted from scratch after the occurrence of failures, and replicating the initial information for these applications, such as JDL and PE descriptors, is sufficient. In addition, checkpoint-based techniques can be used for applications that need extra functionality, e.g., rollback, during restart. As used herein, checkpointing refers to the process of periodically saving the current state information and data values for a given applications to a predetermined storage location accessible by sites within the system. The stored state information and data values are used to restart applications at a given point associated with when the checkpoint information was saved. Some applications cannot tolerate any losses due to failures. For these applications, process-pairs can be used. Process-pairs provide for two separate and parallel instances of the same application running on the site. Upon failures, the demand from high-priority applications can exceed the remaining capability of a site. Therefore, merely using intra-site back-up mechanisms would not suffice. However, the shortcomings of intra-site recovery are addressed by moving part of the application workload to other sites within the cooperative data stream processing system. The mechanisms and techniques used in intra-site recovery are extended to encompass inter-site failure recovery.

Inter-site failure recovery in cooperative data stream processing systems offers resilience by allowing surviving sites to take over the failed applications and other site functionality. In one embodiment, the failure recovery process is separated into four areas, back-up site selection, checkpointing, distributed monitoring and failover. The back-up selection process results in a special agreement between sites for the back-up sites to resume the failed applications after the failure of an identified primary site. The selection is performed on a job-by-job basis, resulting in designating one or more back-up sites for each primary site, depending on the number of jobs needing to be recovered.

For certain high-priority jobs, a checkpointing based technique is used. In one embodiment, the desired checkpoint interval is identified. This identification can be made empirically by leveraging existing work to find an optimal checkpoint frequency, striking a balance between efficiency and effectiveness. In addition, since these checkpoints can be used to recover an application on the same site when it is only the application or the computational node on which the application executed that fails, the location for storing the checkpointed information is also identified in addition to the frequency of producing the checkpoints. In one embodiment, an application is checkpointed frequently for intra-site storage, and the checkpoints are propagated less frequently to one or more back-up sites for inter-site storage. Although described with a predetermined checkpoint interval, checkpoint intervals do not have to be predetermined or periodic and can be ad hoc, adjusted based on past history of system operation or failures or random.

Within a single site, the system can monitor the running PEs and applications in a centralized way. That single site is responsible for restarting the high-priority jobs if they fail, as long as the site itself remains functional. Preferably, central monitoring is not used in the inter-site case, because central monitoring does not scale well and is less reliable than distributed monitoring. In the cooperative data stream processing system back-up sites are used to monitor sites of interest for liveness, i.e., for an indication that the primary site is operating within prescribed parameters. In one embodiment, the primary site sends regularly emitted signals, e.g., periodic heartbeat messages, to its associated back-up sites. If the back-up sites fail to receive the emitted signals within a predefined timeout period, the back-up sites initiate the failure recovery process. In one embodiment, failure recovery within a collection of cooperating sites includes a failover manager that serves as a coordination point to ensure that exactly one site initiates recovery once a failure is detected.

Failover recovery is provided by reinstating the failed applications on back-up sites. Initially, the saved checkpoints are retrieved from stable storage, and local instances of the JMN located on the back-up sites deploy the failed applications using the retrieved checkpointed state information and data values. Each reinstantiated application is connected to the required input data streams to continue the stream processing. Inter-site output from the applications is reconnected to the other sites within the system that access the data through site-to-site tunnels.

Figure 6:
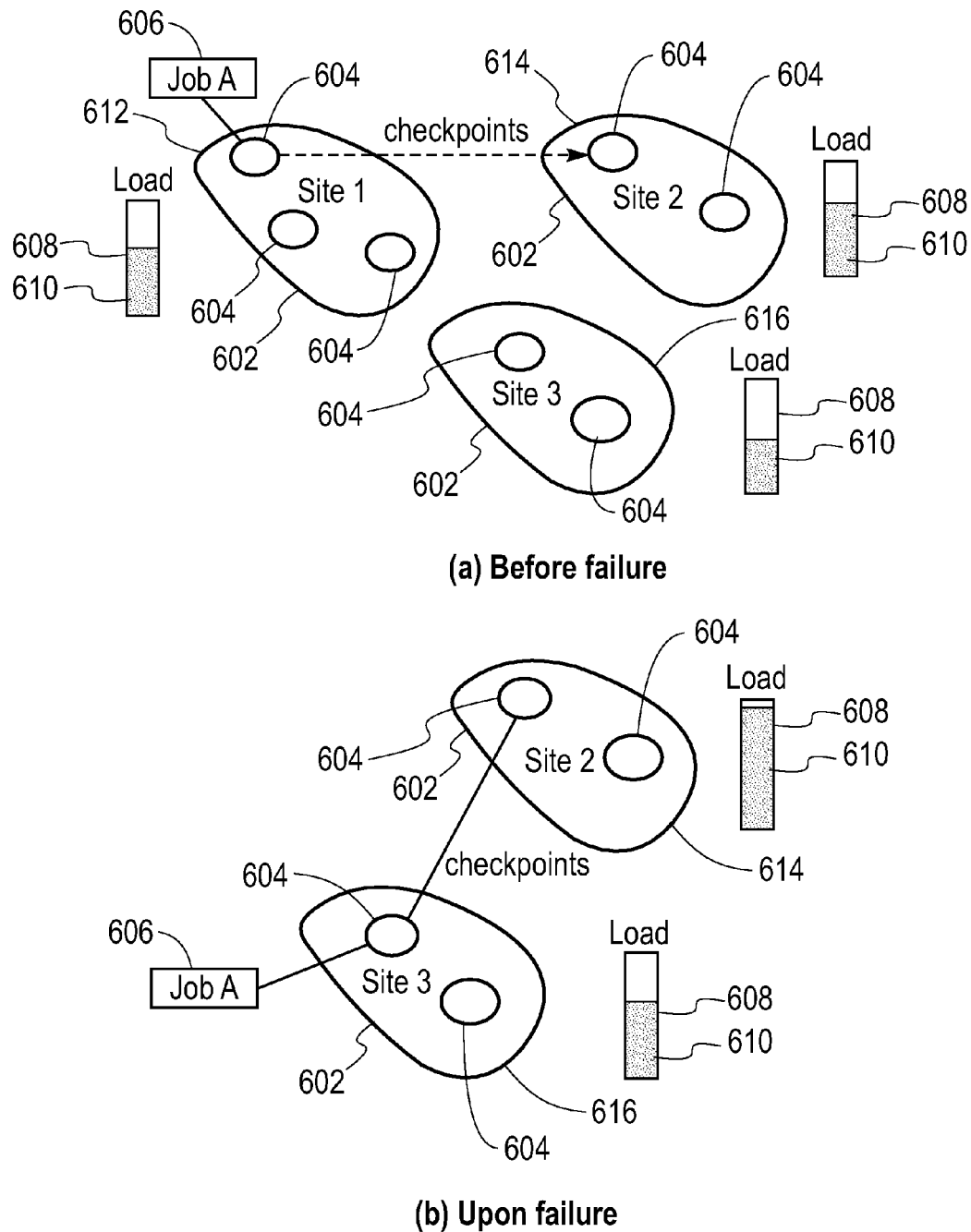
FIG. 6 is a schematic representation of an embodiment of inter-site failure recovery in a cooperative data stream processing system in accordance with the present invention.

Referring to FIG. 6, an exemplary embodiment of inter-site failure recovery 600 in accordance with the present invention is illustrated. Each one of a plurality of sites 602 contains a plurality of computation nodes 604 denoted by small circles. A given job 606 and the applications that constitute that job are deployed on at least one of the computation nodes. Load boxes 608 associated with each site indicate the relative spare capacity of the computation nodes on that site. The shaded area 610 represents current load, or used capacity. Since the cooperative data stream processing system is often overloaded, a computation node's relative capacity refers to the spare capacity that could handle jobs offloaded from other nodes. Before the failure on a first site 612, i.e., the primary site, a second site 614 is more loaded in terms of back-up capacity available to the primary site than a third site 616. Both the second and third sites have been identified as back-up sites for the primary site. The second site 614 monitors the first site continually, and the first site sends periodic checkpoints for the job 606 to the second site for storage. Upon failure of the job 606, the second site detects the failure and in accordance with the CIP has the option to restart the job 606 on one of the nodes located on the second site or to identify another back-up site to restart the job 606. As illustrated, the job 606 is resumed on the third site, because the load 610 on the second site is currently too high.

Recovering an entire site after a failure is a special case of recovering the important applications running on that site. Once applications have been prepared for inter-site failover recovery, by copying their execution environment and possibly their run-time state, the functionality of a failed site can be transferred to one or more back-up sites automatically.

Systems and methods for failure recovery within the cooperative data stream processing system, automatically recovers the failed applications in a timely fashion, taking heterogeneity among the operating environments of the various sites and other factors into account. In one embodiment, conversions are performed when the primary site and the back-up site have different execution environments. In one embodiment, a decision is automatically made regarding whether to re-plan a failed application or simply to restart the applications, according to resource availability, security and privacy constraints among other factors.

In one example application of the failover recovery mechanism of the present invention, remote job execution is implemented, in which JDL is submitted to a Job Manager Proxy on a site, the subjob, including the applications that constitute the subjob, is run on the site, and the output streams are tunneled to other sites within the system on which the output streams are accessed. For each subjob, one or more sites are identified, either manually or automatically, to serve as back-ups and heartbeat monitors. If a failure is detected, the job is restarted on the back-up site and the tunnels are reestablished.

TABLE 1

NOTATION USED IN BACK-UP SELECTION PROBLEM.

| Symbol | Notation |
|---|---|
| n | number of sites |
| $m_i$ | number of important jobs on site i |
| $c_i$ | capacity of site i |
| $f_i^h$ | frequency of heartbeat from site i |
| $s_h^i$ | size of heartbeat message |

TABLE 1-continued

NOTATION USED IN BACK-UP SELECTION PROBLEM.

| Symbol | Notation |
|---|---|
| $f_{jk}^c$ | frequency of checkpoint of job jk |
| $s_{jk}^c$ | size of checkpoint of job jk |
| $d_{ij}$ | communication cost between site i and j |
| $\tau_{ijk}$ | running cost of job jk on site i |
| $l_{jk}$ | importance level of job jk |
| $q_{l_{jk}}$ | reliability requirement of job jk |
| $p_i$ | average survival probability of site i |

In one embodiment, the back-up site selection problem is formulated as follows. Let n denote the number of sites in the cooperative data stream processing system. For each site j, there are $m_j$ important jobs on that site that need to be recovered in case of failure of site j. Site j is the primary site, i.e., home site, for these jobs, and the $k^{th}$ job on primary site j is job jk, k=1, ..., $m_j$.

The reliability of a job is defined to be the probability that the job will be recovered if the primary site, and potentially some other sites that back up this job, fails. Jobs of different importance may have different reliability requirements, and $l_{jk}$ is the importance level of job jk. The value $q_{l_{jk}}$ is the reliability requirement of jobs with importance level $l_{jk}$.

Site i has a total computational capacity $c_i$, and a capacity $\tau_{ijk}$ is required to run job jk on site i. Each primary site should have at least enough capacity to host its primary jobs, i.e., $$\sum_{k=1}^{m_i} \tau_{iik} \le c_i,$$

$$i = 1, \ldots, n.$$

If site i agrees to back-up some jobs on primary site j, then communication is needed between the two sites for purposes of monitoring and checkpointing. Let $d_{ij}$ represent the (unit) communication cost between sites i and j.

Back-up selection finds the most cost-effective way that assigns each job a set of back-up sites on which the failed job would be recovered in order to meet the reliability requirement of that job. A discrete-time decision process is considered where the back-up decisions are made and revised at discrete time epochs. For simplicity of presentation, periodic time epochs are considered. The problem is formulated as a communication cost minimization within a time period subject to the reliability requirements and capacity constraints.

A back-up selection scheme is defined using binary decision variables $x_{ijk}$ (for all i, j, k) such that $$x_{ijk} = \begin{cases} 1 & \text{site } i \text{ recovers job } jk \\ 0 & \text{otherwise} \end{cases}$$

That is, $x_{ijk}$ equals one if and only if job jk would be recovered on site i. Given that the primary and back-up should be different sites:

$$x_{iik}=0 \quad (1)$$

The failure of one site is assumed to be independent of the failure of other sites. Thus, the probability of losing job jk is simply the product of probabilities of losing both the primary site and all the back-up sites. A feasible back-up selection scheme satisfies the reliability requirements for all jobs:

$$\prod_i (1-p_i)^{x_{ijk}} \le 1 - q_{l_{jk}}, \forall j, k.$$

In logarithm form, the above inequality is equivalent to the following linear constraint:

$$\sum_i x_{ijk} \log(1-p_i) \le \log(1-q_{l_{jk}}), \forall j, k \quad (2)$$

Besides the reliability constraint for each job, each site has a capacity constraint. In order to take into account the potential load due to back-up jobs, the following constraint is added:

$$\sum_{k=1}^{m_i} \tau_{iik} + \sum_{j=1}^{n} \sum_{k=1}^{m_j} (1-p_j) x_{ijk} \tau_{iik} \le (1+\varepsilon) c_i, \forall i, \quad (3)$$

which simply says, for each site, the original workload plus the back-up workload should not exceed its capacity up to a factor of $\epsilon$, which is a tunable parameter.

As explained above, if $x_{ijk}=1$, then the primary site j needs to checkpoint back-up site i the current state information of job jk. This checkpoint message is assumed to be of size $s_{jk}^c$ and at frequency $f_{jk}^c$. Therefore, the message incurs a communication cost $s_{jk}^c f_{jk}^c d_{ij}$.

In addition, each back-up site i monitors the primary site j using heartbeat messages. The variable $y_{ij}$ is used to represent this primary back-up relationship:

$$y_{ij} = \begin{cases} 1 & \text{if site } i \text{ monitors site } j \\ 0 & \text{otherwise} \end{cases}$$

Monitoring is necessary between sites i and j if and only if site i agrees to back-up at least one job of site j. Therefore, $y_{ij}$ is defined completely by $x_{ijk}$, as stated below:

$$y_{ij} \le \sum_{k=1}^{m_j} x_{ijk}, \forall i, j \quad (4)$$

$$x_{ijk} \le y_{ij}, \forall i, j \quad (5)$$

If $y_{ij}=1$, then back-up site i sends primary site j heartbeat messages of size $s_{ij}^h$ at frequency $f_{ij}^h$, incurring a communication cost $s_i^h f_i^h d_{ij}$.

Back-up selection so as to minimize the total communication cost can be formulated as the following integer programming problem:

$$\text{Min} \sum_{i=1}^{n} \sum_{j=1}^{n} \sum_{k=1}^{m_j} x_{ijk} s_{jk}^c f_{jk}^c d_{ij} + \sum_{i=1}^{n} \sum_{j=1}^{n} y_{ij} s_i^h f_i^h d_{ij} \quad (6)$$

Subject to constraints (1)-(5) and $x_{ijk}=0$ or 1; $y_{ij}=0$ or 1.
The first term in (6) stands for communication cost incurred by checkpointing, and the second term represents the cost of monitoring.

The complexity of this problem is NP-hard. Even with a moderately sized environment, the explosive combinatorial complexity would cause the standard CPLEX optimization solver to take a significant time to perform the assignments.

Back-up selection has two major constraints, reliability and cost constraints, and is similar to the Distributed Caching Problem (DCP), which is described in I. Baev and R. Rajaraman, *Approximation Algorithms for Data Placement in Arbitrary Networks*, 12$^{th}$ ACM-SIAM Symp. on Discrete Algorithms (SODA), pages 661-670 (2001), and which is known to be NP-hard in the strong sense, i.e., there exists no fully polynomial time approximation scheme (FPTAS). In general, DCP provides that given a set of caches, a set of objects and a set of requests for the various objects, a request i (for object $k_i$) assigned to cache j requires storage cost $s_{k_i}^j$ (of storing object $k_i$ at cache j) and unit communication cost $c_{ij}$ (for fetching the object). The problem is to find the best request-to-cache assignment that minimizes the total communication cost.

To define FPTAS, the following terminologies related to approximation algorithms are defined. An algorithm A with solution value $V^A$ is called an $\epsilon$-approximation algorithm if $$\frac{V^A - V^*}{V^*} \le \varepsilon$$

holds for all problem instances, where V* represents the optimal solution value. The value $\epsilon$ is called the approximation ratio. An FPTAS scheme can reach any given approximation ratio $\epsilon > 0$ and has a running time polynomial in the input size and in the reciprocal of the approximation ratio.

Although the problem has no FPTAS, it is possible, however, to develop some good approximation algorithms (in polynomial time) based on heuristics by exploiting the special structure of the constraints. For example, recent work considers a maximization version of the DCP problem in which a 1/e-approximation algorithm is provided and shown that 1/e is the theoretical lower bound on the approximation ratio that any approximation algorithm can achieve for DCP. Translating the result into a (cost) minimization version of the problem is equivalent to saying that no polynomial time approximation algorithm can guarantee a lower than 1/e approximation ratio.

In accordance with the present invention, an online solution to back-up selection is provided that results in good empirical approximation guarantees compared to an offline optimal solution. The offline problem assumes that all the jobs are present and their parameters are known a priori. The offline problem, therefore, represents the best scenario and can be used as benchmarks. The online approach treats each job separately, i.e., finding back-up sites for each job sequentially. There are two underlying reasons for treating each job separately. First, jobs are presented to the systems in an online fashion in the real implementation of the cooperative data stream processing system, i.e., jobs come into the system and complete independently. It is unnecessary and inefficient to reassign all the existing jobs every time a new job arrives. Frequent change of back-up sites causes consistency problem for existing jobs and renders large communication overhead. For example, to keep checkpoints consistent, stored checkpoints must be shipped across the network for those jobs that have recently changed their back-up sites. On the contrary, in an online assignment setting, only incremental checkpoints are sent across the network. The second reason is that this simplification makes the solution tractable. From the point of view of any single job, back-up selection can be converted to a knapsack problem, which has a well-known fully polynomial-time approximation scheme (FPTAS). Therefore, an approximation ratio $\epsilon$ can be achieved in polynomial time for arbitrarily small $\epsilon > 0$. Conversely, there is no fully polynomial time solution for the once-in-a-while, i.e., offline, complete reassignment approach. Back-up selection is performed while a new job is created, and this should be done in a real-time fashion, making the once-in-a-while complete reassignment approach unnecessary. Therefore, the back-up allocation process should be performed in an online manner as well.

In one embodiment, the online back-up selection problem has a simpler form than (6) and can be converted into a standard knapsack problem. The online problem considers one job at a time upon its arrival. The size of the checkpoint message can be relatively large, often on the order of megabytes if not larger and is typically several orders of magnitude larger than the heartbeat message. Thus for a single job, the checkpoint overhead dominates the overall communication overhead, and the monitoring cost incurred by the heartbeat messages can be removed or ignored. Therefore, for a single job jk, the objective function becomes:

$$\text{Min} \sum_{i=1}^{n} x_{ijk} s_{jk}^c f_{jk}^c d_{ij} \tag{7}$$

An auxiliary variable $z_{ijk}$ is defined such that $z_{ijk} = 1 - x_{ijk}$. Since $x_{ijk}$ is the indicator of site i being selected to back-up job jk, then $z_{ijk}$ indicates whether site i has been deselected to back-up job jk. Substituting $z_{ijk}$ for $x_{ijk}$ in (2), the reliability requirement of job jk becomes:

$$\sum_i z_{ijk} v_i \le V_{jk}, \tag{8}$$

where $$v_i = \log \frac{1}{1 - p_i} \text{ and } V_{ij} = \log \frac{1 - q_{l_{jk}}}{\prod_i (1 - p_i)}.$$

Given that $p_i$ is less than one, $v_i$ is guaranteed to be non-negative. The term $V_{jk}$ should be non-negative as well. This is because the reliability constraint (2) of a job must be satisfied when all sites are willing to back-up for that job. Otherwise, the job's reliability constraint is simply unreasonable, and there is no feasible solution to the problem. The term $V_{jk}$ is interpreted as the total volume of job jk, and it takes away volume $v_i$ by deselecting site i, i.e., by setting $z_{ijk} = 1$. Constraint (8) says that one can deselect sites up to the total volume $V_{jk}$.

Substituting $z_{ijk}$ for $x_{ijk}$ into the objective function (7) and the rest of the constraints, the online back-up selection (for job jk) can now be reformulated as the following single-job optimization problem:

[Single-Opt]

$$\text{Max} \sum_{i=1}^{n} z_{ijk} P_{ijk} \quad (9)$$

Subject to constraints (8) and (3) and $z_{ijk}=0$ or $\forall i \neq j$.

where $P_{ijk}=s_{jk}{}^c f_{jk}{}^c d_{ij}$ is the saving on communication cost by deselecting site i. That is, the problem is to deselect as many sites as possible so as to maximize the total cost savings subject to constraints (8) and (3).

Since there is only a single job, constraint (3) can be easily checked to filter out sites that do not have enough (residual) computational capacity to back-up job jk. The value $\Omega_{jk}$ is denoted the set of sites that satisfy (3). The problem [Single-Opt] then becomes a packing problem that aims to pack, i.e., deselect, as many sites in $\Omega_{jk}$ as possible subject to the total volume constraint (8) so as to maximize the total cost savings (9).

The above problem is a standard 0-1 knapsack problem. The statement of a standard 0-1 knapsack problem is that given a set of items of different profits and volumes, the most valuable subset of items that fit in a knapsack of fixed capacity is found. In the online back-up selection setting, for each job jk, sites in set $\omega_{jk}$ are equivalent to the items waiting to be packed, i.e., deselected. Each site has a survival probability (in log format $c_i$), which acts as its volume. The communication cost saving is regarded as the profit by packing, i.e., deselecting, a site. The back-up selection can now be stated using the standard knapsack terminology. Given a set $\Omega_{jk}$ of sites of different "profits" and "volumes", the most valuable subset (as expressed by (9)) is found without exceeding the total available volume (as expressed by (8)). Therefore, the problem is solved by leveraging existing techniques for standard 0-1 knapsack problems.

Since even the simplest knapsack problem is NP-hard, finding an exact solution is time-consuming. In addition, given the inherent dynamic nature of the cooperative date stream processing system, e.g., the fast-changing resource availability on each site, only approximate information is available to help to make the back-up selection decision. Therefore, a good approximation algorithm would suffice.

A fully polynomial time approximation scheme (FPTAS) for the 0-1 knapsack problem has been proposed and is described in O. H. Ibarra and C. E. Kim, Fast *Approximation Algorithms for the Knapsack and Sum of Subset Problems*, ACM, 22(4):463-468, (1975) ISSN 0004-5411. This algorithm is leveraged to solve the [Single-Opt] problem. The online algorithm can be described as follows. On-line approximation algorithm (for job jk):

1. Identify set $\Omega_{jk}$ by filtering out sites that do not satisfy (3).
2. Apply FPTAS of Ibarra and Kim to solve the knapsack problem for items in $\Omega_{jk}$ with the objective of maximizing profit (9), subject to volume constraint (8).
3. Once solution z is obtained for [Single-Opt], obtain the back-up selection solution x by setting x=1-z.

For completeness, a sketch of the FPTAS is provided. The greedy heuristic by sorting the items in non-increasing order of their profit to volume ratio and then packing the items in that order until reaching the knapsack capacity can produce a solution $\tilde{V}$ satisfying $$\frac{1}{2}\tilde{V} \leq V^* \leq \tilde{V},$$

where V* denotes the optimal solution value. In order to provide an FPTAS approximation algorithm with approximation ratio $\epsilon$ for an arbitrarily small $\epsilon>0$, the key idea of Ibarra and Kim is to separate items according to their profits into "large" items and "small" items, where an item is "small" if $$P_{ijk} \leq \frac{\varepsilon}{3}\tilde{V},$$

and "large" otherwise. Solving the problem for "large" items only using dynamic programming, the "small" items are then inserted to fill the remaining capacity.

Extensive simulations were conducted, and the approximation algorithm was compared to the offline solutions obtained using GLPK, which is described in GLPK online resource, http://www.gnu.org/software/glpk/. GLPK was chosen because of its resemblance to the commercial product CPLEX and their competitive performance. In the comparison, both efficiency and effectiveness of the solution were considered.

Figure 7:
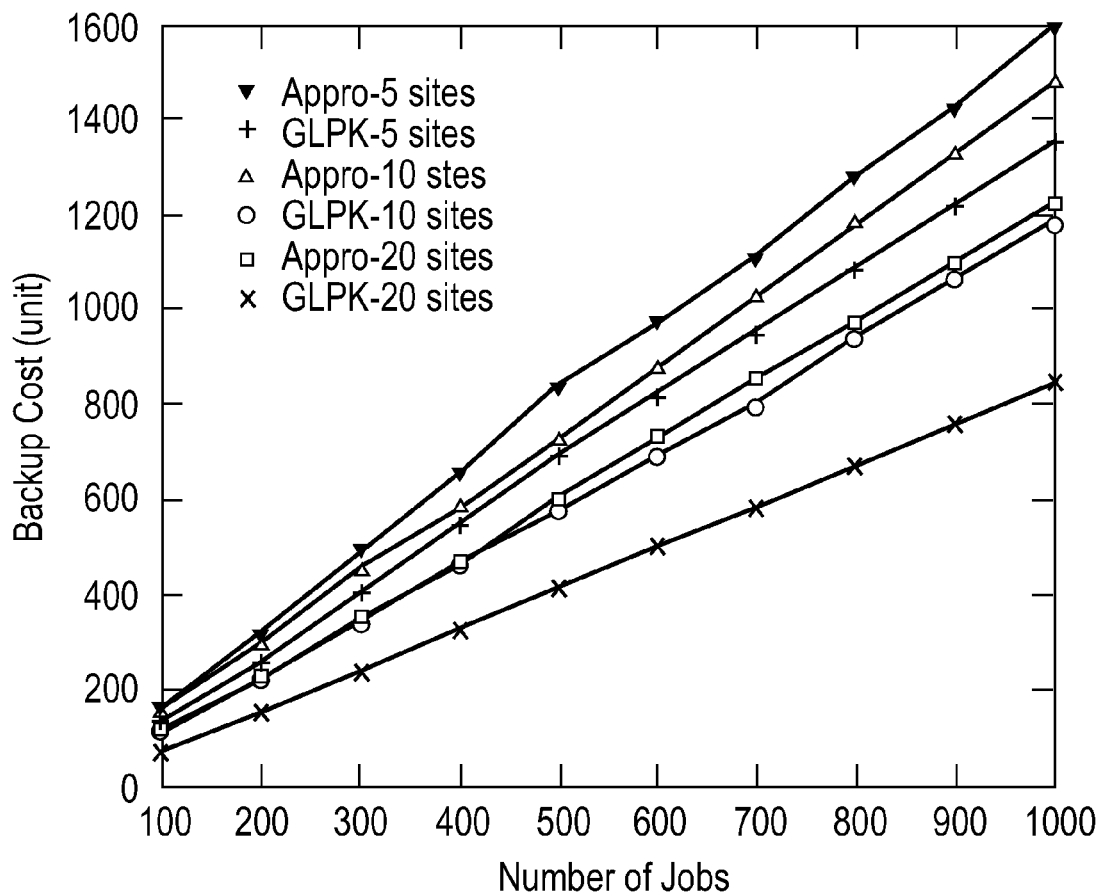
FIG. 7 is a graph illustrating an embodiment of back-up cost using an approximation algorithm and the GLPK-based optimal approach.

Referring to FIG. 7, the results are illustrated in terms of effectiveness. The simulations were conducted with different settings by varying the number of jobs and the number of candidate sites. The label "Appro-X" represents the approximation algorithm and X refers to the number of sites. The label "GLPK-X" represents the corresponding solutions from GLPK. As can be seen, the algorithm can provide an approximation ratio within 50% in terms of back-up cost compared with the optimal offline solution. This is quite promising as 1/e~37% is the theoretical lower bound that any approximation algorithm can achieve.

Figure 8:
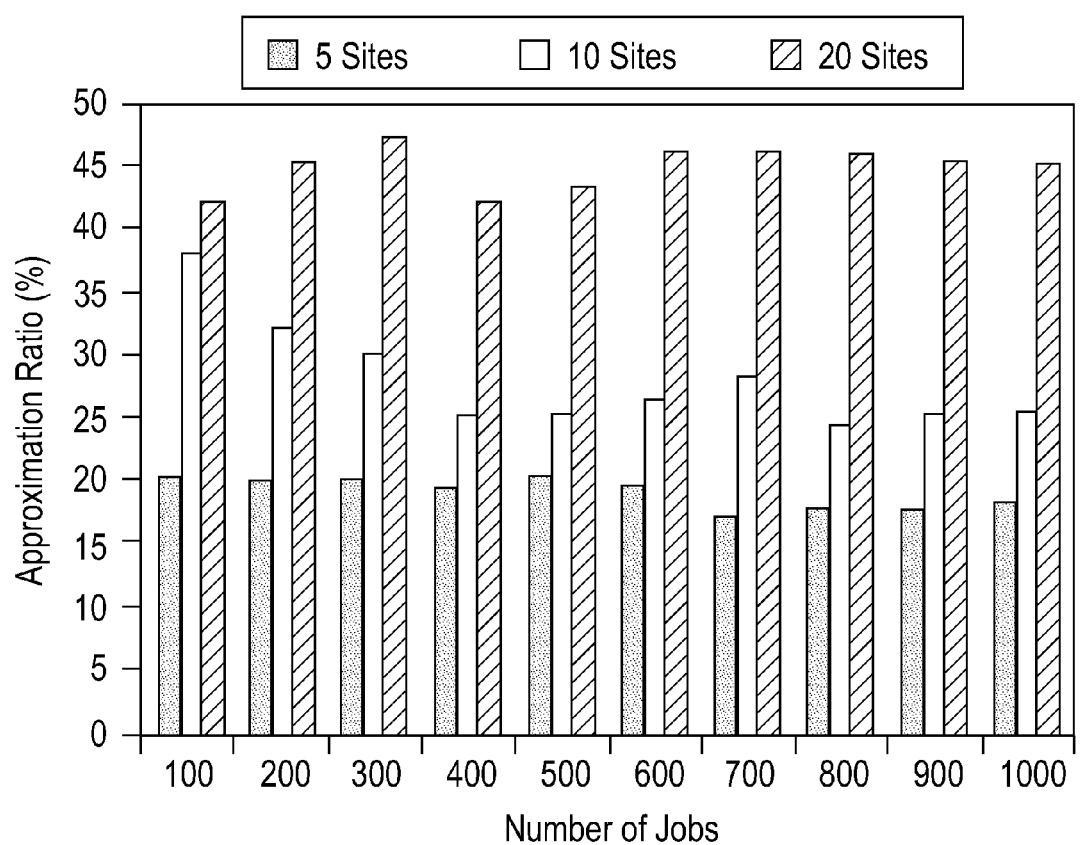
FIG. 8 is a graph illustrating an embodiment of the relative quality of the approximation algorithm.

Referring to FIG. 8, these results are depicted as the relative quality between the approximation algorithm and GLPK-based offline optimal solution. The "approximation ratio" refers to the empirical ratio of the additional cost of backing up applications using the assignments from the approximation algorithm, to the cost of the GLPK assignment. The approximation ratio varies from 20-45% and is generally much more sensitive to the number of sites than the number of jobs. This phenomenon originates from the conversion described above where the original problem was converted to a knapsack problem in which sites act as the to-be-packed items and jobs as the knapsacks by using the standard knapsack terminology. In the approximation algorithm, each job finds its back-up site independently, and its reliability requirement is always satisfied, as expressed by Equation (8). The total communication cost are expressed as the sum of the communication cost to back-up each job, as expressed by Equation (9), which is approximated independently and sensitive to the number of sites. Therefore, the approximation ratio varies with the number of sites rather than the number of jobs.

Figure 9:
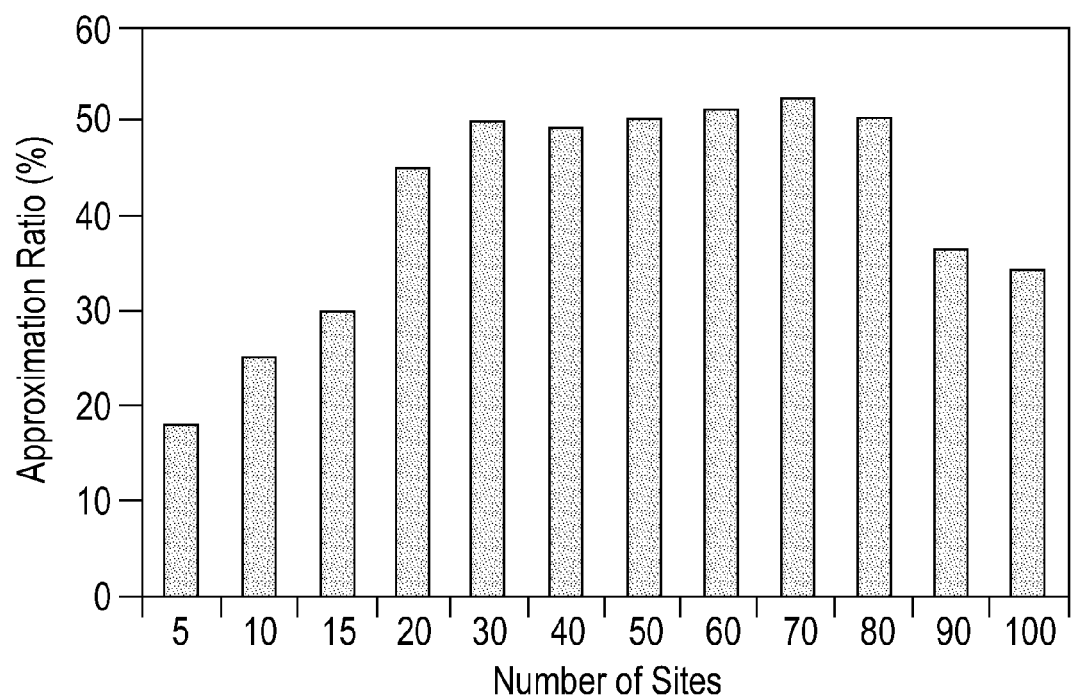
FIG. 9 is a graph illustrating an embodiment of the scalability of the approximation algorithm.

Next, the number of jobs is fixed to be 1000, and the number of sites is varied. Referring to FIG. 9, the algorithm can approximate the optimal solution within 50% even with a large number of sites, and it performs quite well even when the number of sites reaches the order of one hundred.

The biggest advantage of the approximation algorithm over the offline approach is efficiency. Although significant optimization has been done on GLPK, it was still too slow to solve the problem and requires hours of computational time to solve a relatively small problem. In order to complete the experimentation within a reasonable time, we adopted the cutting plane option in GLPK so that the offline solutions are obtained in a much faster way while providing only approximation quality solutions.

Figure 10:
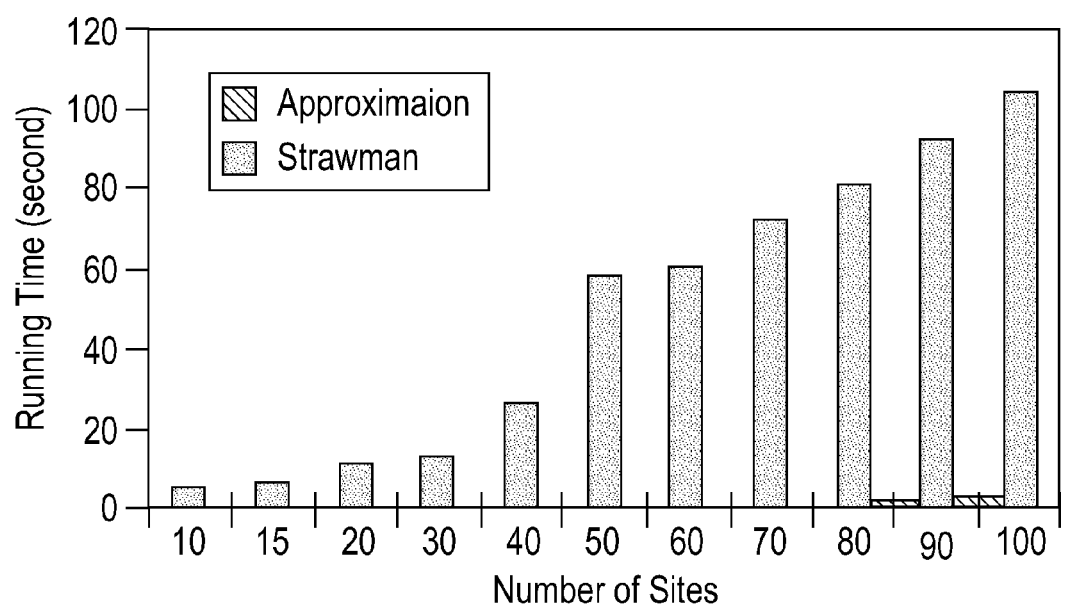
FIG. 10 is a graph illustrating an embodiment of a running speed comparison of the approximation algorithm.

The number of jobs is set to 1000, the number of sites is varied from 5 to 100 to conduct the experiment. Referring to FIG. 10, the algorithm greatly outperforms the GLPK-based approach in terms of speed. The algorithm can solve the back-up selection problem within a sub-second when the number of sites is less than 80 and within 2 seconds when the number of sites is 90-100. On the contrary, the running time of the offline approach increases steadily and reaches 100 seconds when the number of sites equal 100.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for providing failure recovery in cooperative data stream processing in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for providing failure recovery in cooperative data stream processing, the method comprising:
   identifying a plurality of autonomous distributed sites, each site comprising one or more nodes and each site configured to host, using the nodes on that site and independently of the other sites, applications associated with jobs derived from inquiries to process continuous dynamic streams of data;
   using the plurality of sites to negotiate common interest policies among the sites, each common interest policy defining a relationship between two autonomous sites by specifying data sources each site is willing to share and processing each site is willing to perform; and
   using an inter-site back-up mechanism to provide failure recovery by negotiating among the autonomous sites to identify in advance of a failure at least one back-up site for each autonomous site based on the negotiated common interest policies, the inter-site back-up mechanism comprising back-up sites selected from the identified plurality of sites, each back-up site configured to host, using nodes on that site and independently of the other sites, applications that were running on failed sites;
   wherein each site comprises a self-contained, fully functional instance of a cooperative data stream processing system for providing cooperative data stream processing.

2. The method of claim 1, wherein the step of using the inter-site back-up mechanism further comprises:
   identifying a primary site from the plurality of distributed sites; and
   selecting a plurality of back-up sites from the plurality of distributed sites to provide failure recovery for the identified primary site.

3. The method of claim 1, wherein the step of using the inter-site back-up mechanism further comprises saving current state information and current data values at pre-determined intervals for one or more applications hosted on the nodes.

4. The method of claim 3, wherein the step of saving current state information and current data values further comprises:
    identifying high priority applications having associated priority levels above a pre-determined level to have state information and data values saved; and
    identifying for each identified application the pre-determined interval for saving state information and data values.

5. The method of claim 4, wherein the step of identifying the pre-determined interval further comprises identifying the pre-determined interval empirically.

6. The method of claim 2, wherein the step of using the inter-site back-up mechanism further comprises identifying a monitoring site to monitor for a periodically emitted signal from the identified primary site indicating that the primary site is operating within prescribed parameters.

7. The method of claim 6, wherein the step of using the identified monitoring site to monitor for the periodically emitted signal further comprises:
    identifying a pre-defined interval for sending the periodically emitted signal from the identified primary site to the identified monitoring site; and
    initiating an inter-site failure recovery procedure if the periodically emitted signal is not received at the monitoring site within the pre-defined interval.

8. The method of claim 6, wherein the step of using the inter-site back-up mechanism further comprises:
    identifying a plurality of additional sites to monitor for the periodically emitted signal;
    communicating status of receipt of the periodically emitted signals at each one of the additional sites to the monitoring site;
    identifying a pre-defined interval for sending the periodically emitted signal from the identified primary site to the identified monitoring site; and
    initiating an inter-site failure recovery procedure if the periodically emitted signal is not received at the monitoring site within the pre-defined interval and the status of receipt at all of the additional monitoring sites is that the periodically signal was not received.

9. The method of claim 7, wherein the step of initiating the inter-site failure recovery procedure further comprises using a failover manager in communication with each one of the identified back-up sites to prohibit more than one of the identified back-up sites from initiating the inter-site failure recovery.

10. The method of claim 6, wherein:
    the method further comprises identifying one or more critical applications running on the primary site; and
    the step of using the inter-site back-up mechanism further comprises:
        identifying a failure condition on the primary site; and
        recovering the identified critical applications for the failed primary site.

11. The method of claim 10, wherein the step of recovering the critical applications comprises retrieving previously saved state information and data values for the critical applications, using job manager instances on the back-up sites to reinstate the critical applications, reestablishing connections between the critical and appropriate data streams, reestablishing tunneling among sites for inter-site output of data generated by the reinstated applications or combinations thereof.

12. The method of claim 10, wherein the step of recovering the critical applications comprises:
    halting existing tunneling with the failed primary site;
    creating new monitoring agreements to handle the recovered critical applications;
    reconfiguring tunneling with the recovered critical applications; and
    re-deploying critical applications to back-up sites.

13. The method of claim 10, wherein the step of using the inter-site back-up mechanism further comprises notifying sites cooperating with the failed primary site and affected by the failure of the primary site.

14. The method of claim 10, wherein the step of reinstating the critical applications further comprises compensating for differences in execution environments between the primary site and the back-up sites.

15. The method of claim 1, further comprising using an intra-site back-up mechanism on each one of the plurality of identified sites to provide failure recovery.

16. The method of claim 15, wherein the step of using an intra-site back-up mechanism further comprises:
    terminating lower priority applications running on nodes within a given site; and
    redistributing higher priority applications among all of the nodes on the given site.

17. The method of claim 14, wherein:
    each site comprises an inquiry services layer to produce jobs from a high level description of end results and to facilitate description of jobs in a desired language; and
    the step of using the intra-site back-up mechanism further comprises using the inquiry services layer to replan, reproduce and execute at least a portion of the jobs executing on a given site based upon resource availability on that site following a failure of the primary site.

18. The method of claim 1, wherein each site comprising components capable of independently processing continuous dynamic streams of data; and
    the step of using the inter-site back-up mechanism further comprises using the inter-site back-up mechanism to recover the components running on each site.

19. A non-transitory computer-readable storage medium containing a computer-readable code that when read by a computer causes the computer to perform a method for providing failure recovery in cooperative data stream processing, the method comprising: identifying a plurality of autonomous distributed sites, each site comprising one or more nodes and each site configured to host, using the nodes on that site and independently of the other sites, applications associated with jobs derived from inquiries to process continuous dynamic streams of data; using the plurality of sites to negotiate common interest policies among the sites, each common interest policy defining a relationship between two autonomous sites by specifying data sources each site is willing to share and processing each site is willing to perform; and using an inter-site back-up mechanism to provide failure recovery by negotiating among the autonomous sites to identify in advance of a failure at least one back-up site for each autonomous site based on the negotiated common interest policies, the inter-site back-up mechanism comprising back-up sites selected from the identified plurality of sites, each back-up site configured to host, using nodes on that site and independently of the other sites, applications that were running on failed sites; wherein each site comprises a self-contained, fully functional instance of a cooperative data stream processing system for providing cooperative data stream processing.

20. The non-transitory computer-readable storage medium of claim 19, wherein the step of using the inter-site back-up mechanism further comprises: identifying a primary site from the plurality of distributed sites; and selecting a plurality of back-up sites from the plurality of distributed sites to provide failure recovery for the identified primary site.

* * * * *